(12) United States Patent
Furuta

(10) Patent No.: US 9,969,844 B2
(45) Date of Patent: May 15, 2018

(54) SILICONE LIGANDS FOR QUANTUM DOTS

(71) Applicant: NANOSYS, Inc., Milpitas, CA (US)

(72) Inventor: Paul T. Furuta, Sunnyvale, CA (US)

(73) Assignee: Nanosys, Inc., Milpitas, CA (US)

( * ) Notice: Subject to any disclaimer, the term of this patent is extended or adjusted under 35 U.S.C. 154(b) by 143 days.

(21) Appl. No.: 14/801,314

(22) Filed: Jul. 16, 2015

(65) Prior Publication Data

US 2016/0017099 A1    Jan. 21, 2016

Related U.S. Application Data

(60) Provisional application No. 62/025,262, filed on Jul. 16, 2014.

(51) Int. Cl.
| | | |
|---|---|---|
| C08G 77/28 | (2006.01) | |
| C08G 77/392 | (2006.01) | |
| C09K 11/02 | (2006.01) | |
| C09K 11/70 | (2006.01) | |
| C08G 77/382 | (2006.01) | |

(52) U.S. Cl.
CPC .......... *C08G 77/392* (2013.01); *C09K 11/025* (2013.01); *C09K 11/70* (2013.01); *C08G 77/28* (2013.01); *C08G 77/382* (2013.01)

(58) Field of Classification Search
CPC ............................. C08G 77/382; C08G 77/28
USPC ........................................................... 528/30
See application file for complete search history.

(56) References Cited

U.S. PATENT DOCUMENTS

| | | | | |
|---|---|---|---|---|
| 3,370,076 A | * | 2/1968 | Niederprum | C08G 77/00 508/205 |
| 3,392,182 A | * | 7/1968 | Koerner | C07F 7/0834 424/70.12 |
| 3,884,860 A | * | 5/1975 | Brown | C08L 63/00 524/588 |
| 3,899,515 A | * | 8/1975 | Speier | C07F 7/182 549/214 |
| 4,011,362 A | * | 3/1977 | Stewart | B05D 5/08 106/287.12 |
| 4,472,341 A | * | 9/1984 | Alberino | B29C 33/64 252/182.14 |
| 5,504,233 A | * | 4/1996 | Bindl | C08G 77/38 556/415 |
| 6,207,229 B1 | | 3/2001 | Bawendi et al. | |
| 6,225,198 B1 | | 5/2001 | Alivisatos et al. | |
| 6,322,901 B1 | | 11/2001 | Bawendi et al. | |
| 6,861,155 B2 | | 3/2005 | Bawendi et al. | |
| 6,872,249 B2 | | 3/2005 | Peng et al. | |
| 6,949,206 B2 | | 9/2005 | Whiteford et al. | |
| 7,267,865 B2 | | 9/2007 | Hetzler et al. | |
| 7,374,807 B2 | | 5/2008 | Parce et al. | |
| 7,572,393 B2 | | 8/2009 | Whiteford et al. | |
| 7,750,235 B2 | | 7/2010 | Scher et al. | |
| 8,053,972 B2 | | 11/2011 | Bawendi et al. | |
| 8,343,575 B2 | | 1/2013 | Dubrow | |
| 8,563,133 B2 | | 10/2013 | Whiteford et al. | |
| 2006/0216259 A1 | | 9/2006 | Haubennestel et al. | |
| 2007/0142553 A1 | * | 6/2007 | Perry | C08G 77/28 525/105 |
| 2010/0276638 A1 | | 11/2010 | Liu et al. | |
| 2013/0345458 A1 | * | 12/2013 | Freeman | C08G 77/38 556/12 |
| 2014/0309446 A1 | * | 10/2014 | Amajjahe | A61K 8/899 556/418 |

FOREIGN PATENT DOCUMENTS

| | | |
|---|---|---|
| WO | WO 2012/129380 A2 | 9/2012 |
| WO | WO 2013/052181 A2 | 4/2013 |
| WO | WO 2013/191964 A1 | 12/2013 |

OTHER PUBLICATIONS

Alivisatos, A.P., "Semiconductor Clusters, Nanocrystals, and Quantum Dots," *Science* 271:933-937, American Association for the Advancement of Science, United States (Feb. 16, 1996).

Chen, J. et al., "Quantum-Dot Displays: Giving LCDs a Competitive Edge through Color," *Information Display* 1/13:12-17, Society for Information Display, United States (2013).

Murray, C.B., et al., "Synthesis and Characterization of Nearly Monodisperse CdE (E=S, Se, Te) Semiconductor Nanocrystallites," *J. Am. Chem. Soc.* 115(19):8706-8715, American Chemical Society, United States (1993).

Peng, X., et al., "Epitaxial Growth of Highly Luminescent CdSe/CdS Core/Shell Nanocrystals with Photostability and Electronic Accessibility," *J. Am. Chem. Soc.* 119(30):7019-7029, American Chemical Society, United States (1997).

International Search Report for International Patent Application No. PCT/US15/40531, completed Sep. 11, 2015, dated Oct. 7, 2015, U.S. Patent and Trademark Office, Alexandria, Virginia.

\* cited by examiner

*Primary Examiner* — Margaret G Moore
(74) *Attorney, Agent, or Firm* — Sterne, Kessler, Goldstein & Fox P.L.L.C.

(57) ABSTRACT

The present invention relates to silicone polymer ligands for binding to quantum dots. The silicone polymer ligands contain a multiplicity of amine, carboxy, and/or phosphine binding groups suitable for attachment to quantum dots. The present invention also describes a process for the preparation of quantum dot binding ligands.

20 Claims, No Drawings

SILICONE LIGANDS FOR QUANTUM DOTS

BACKGROUND OF THE INVENTION

Field of the Invention

The present invention relates to silicone polymer ligands for binding to quantum dots. The silicone polymer ligands contain a multiplicity of amine, carboxy, and/or phosphine binding groups suitable for attachment to quantum dots. The present invention also describes a process for the preparation of quantum dot binding ligands.

Background Art

High performance down-converting phosphor technologies will play a prominent role in the next generation of visible light emission, including high efficiency solid-state white lighting (SSWL). In addition, such technologies are also applicable to near infrared (NIR) and infrared (IR) light emitting technologies. Down-conversion from ultraviolet (UV) or blue light emitting semiconductor light emitting diodes (LEDs) into blue, red, and green wavelengths offers a fast, efficient and cost-effective path for delivering commercially attractive white light sources. Unfortunately, existing rare-earth activated phosphors or halophosphates, which are currently the primary source for solid-state down-conversion, were originally developed for use in fluorescent lamps and cathode ray tubes (CRTs), and therefore have a number of critical shortfalls when it comes to the unique requirements of SSWL. As such, while some SSWL systems are available, poor power efficiency, poor color rendering, and extremely high costs limit this technology to niche markets such as flashlights and walkway lighting.

Furthermore, LEDs often suffer from reduced performance as a result of internal reflection of photons at the chip/coating interface. Typically, LEDs are encapsulated or coated in a polymeric material (which may comprise phosphors) to provide stability to the light-emitting chip. Currently these coatings are made by using an inorganic or organic coating that has a very different refractive index than the base material (i.e., the chip), which results in a detrimental optical effect due to the refractive index mismatch at the interface between the two materials. In addition, the temperature of the LED can reach in excess of 100° C. To allow for the expansion and contraction that can accompany this temperature rise, a compliant polymeric layer (e.g., silicone) is often placed in contact with the chip. In order to provide additional stability to the LED, this compliant layer is often further coated with a hard shell polymer.

The resulting LED structure suffers loss of light at the chip/compliant polymer interface due to the lower refractive index of the polymer coating in relation to the LED. However, if the refractive index of the compliant layer is increased, even greater loss will occur due to the high refractive index/low refractive index interface between the compliant polymer and the hard shell polymer due to internal reflection.

There are several critical factors which result in poor power efficiencies when using traditional inorganic phosphors for SSWL. These include: total internal reflection at the LED-chip and phosphor layer interface resulting in poor light extraction from the LED into the phosphor layer; poor extraction efficiency from the phosphor layer into the surroundings due to scattering of the light generated by the phosphor particles as well as parasitic absorption by the LED chip, metal contacts, and housing; broad phosphor emission in the red wavelength range resulting in unused photons emitted into the near-IR; and poor down-conversion efficiency of the phosphors themselves when excited in the blue wavelength range (this is a combination of absorption and emission efficiency). While efficiencies improve with UV excitation, additional loss due to larger Stokes-shifted emission and lower efficiencies of LEDs in the UV versus the blue wavelength range makes this a less appealing solution overall.

Quantum dots were first developed in the 1980s at Bell Labs and have the unique ability to emit light at a single spectral peak with narrow line width, creating highly saturated colors. Additionally, it is possible to tune the emission wavelength based on the size of the quantum dots. This ability to tune the emission wavelength enables display engineers to custom engineer a spectrum of light to maximize both the efficiency and color performance of the display.

Using the size-dependent properties of quantum dots it is possible to produce a Quantum-Dot Enhancement Film (QDEF). The film combines trillions of red- and green-emitting quantum dots in a thin sheet that emits finely tuned white light when stimulated by blue light. The QDEF can be custom formulated for different display technologies—some for a wide color gamut and some for energy/light efficiency. This ability to tune the properties allows display engineers to tune the backlight spectrum of a display to meet exact performance needs.

BRIEF SUMMARY OF THE INVENTION

In some embodiments, the present invention provides a quantum dot binding ligand comprising the structure of formula I:

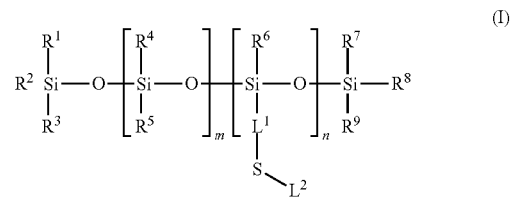

(I)

wherein $R^1$, $R^2$, $R^3$, $R^7$, $R^8$, and $R^9$ are each independently $C_{1-20}$ alkyl, $C_{2-20}$ alkenyl, $C_{2-20}$ alkynyl, $-L^3-(R^{11})_q$, cycloalkyl, or aryl;

$R^4$ and $R^5$ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

$R^6$ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

each $R^{11}$ is independently $NR^{2a}R^{2b}$, $C(O)OH$, or $PR^{3a}R^{3b}$;

each of $R^{2a}$ and $R^{2b}$ is independently H or $C_{1-6}$ alkyl;

each of $R^{3a}$ and $R^{3b}$ is independently H or $C_{1-6}$ alkyl;

each $L^1$ is independently $C_{2-20}$ alkylene, $C_{2-20}$ heteroalkylene, or $C_{2-8}$ alkylene-O—$C_{2-8}$ alkylene;

each $L^2$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^2$ is substituted with one or more $(R^{10})_q$, $Si(R^{12})_3$, or $C_{3-10}$ cycloalkoxy;

each $L^3$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$;

each $R^{10}$ is independently $NR^{2a}R^{2b}$, C(O)OH, or $PR^{3a}R^{3b}$;

each $R^{12}$ is independently $C_{1-6}$ alkyl, cycloalkyl, or aryl;

m is 0 to 1000;

n is 1 to 50; and q is 1 to 10.

In some embodiments, $R^1$, $R^2$, $R^3$, $R^7$, $R^8$, and $R^9$ are each independently $C_{1-20}$ alkyl, $C_{2-20}$ alkenyl, $C_{2-20}$ alkynyl, -$L^3$-$(R^{11})_q$, cycloalkyl, or aryl; $R^4$ is $C_{1-20}$ alkyl, $C_{2-20}$ alkenyl, $C_{2-20}$ alkynyl, cycloalkyl, or aryl; $R^5$ is $C_{8-20}$ alkyl, $C_{8-20}$ heteroalkyl, cycloalkyl, or aryl; $R^6$ is $C_{1-20}$ alkyl, $C_{1-20}$ heteroalkyl, $C_{2-20}$ alkenyl, $C_{2-20}$ alkynyl, cycloalkyl, or aryl; each $L^1$ and $L^2$ is independently $C_{3-8}$ alkylene; each $R^{10}$ is independently $NR^{2a}R^{2b}$ or C(O)OH; each of $R^{2a}$ and $R^{2b}$ is H or $C_{1-6}$ alkyl; each $L^3$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$; m is an integer from 5 to 100; n is an integer from 1 to 10; and q is an integer from 1 to 10.

In some embodiments, $L^1$ is independently selected from the group consisting of $C_{3-8}$ alkylene and $C_{3-8}$ alkylene-O—$C_{2-8}$ alkylene.

In some embodiments, $L^1$ is independently selected from the group consisting of propylene, butylene, pentylene, or n-propylene-O-isopropylene.

In some embodiments, at least one $L^2$ group is substituted by $(R^{10})_q$.

In some embodiments, the $L^2$-$(R^{10})_q$ is independently selected from the group consisting of $C_{3-8}$ alkylene-C(O)OH, $C_{3-8}$ alkylene-(C(O)OH)$_2$, $C_{3-8}$ alkylene-O—$C_{2-8}$ alkylene-(C(O)OH)$_3$, $C_{3-8}$ alkylene-$NR^{2a}R^{2b}$, $C_{3-8}$ alkylene-(C(O)NH—$C_{2-8}$ alkylene-$NR^{2a}R^{2b}$)$_2$, $C_{3-8}$ alkylene-$PR^{3a}R^{3b}$, $C_{3-8}$ alkylene-O—$C_{2-8}$ alkylene-$PR^{3a}R^{3b}$, and $C_{3-8}$ alkylene-(C(O)NH—$C_{2-8}$ alkylene-$PR^{3a}R^{3b}$)$_2$.

In some embodiments, the $L^2$-$(R^{10})_q$ is independently selected from the group consisting of $C_{3-8}$ alkylene-C(O)OH, $C_{3-8}$ alkylene-(C(O)OH)$_2$, and $C_{3-8}$ alkylene-$NR^{2a}R^{2b}$.

In some embodiments, the $L^2$-$(R^{10})_q$ is independently selected from the group consisting of:

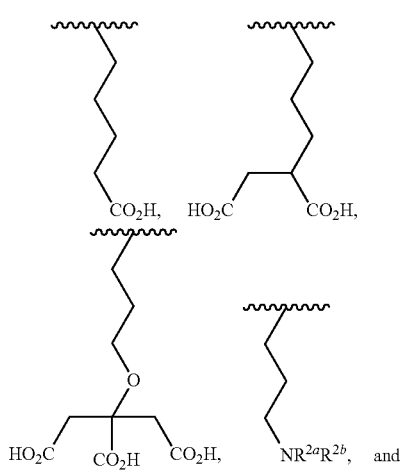

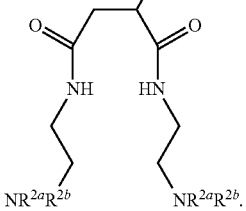

In some embodiments, at least one $L^2$ group is substituted by $Si(R^{12})_3$.

In some embodiments, the $Si(R^{12})_3$ is $Si(CH_3)_3$.

In some embodiments, the quantum dot binding ligand comprises 1, 2, 3, or 4 different kinds of n repeat units.

In some embodiments, at least one $L^2$ group is substituted by $(R^{10})_q$ and at least one $L^2$ group is substituted by $Si(R^{12})_3$.

In some embodiments, $R^1$, $R^2$, $R^3$, $R^7$, $R^8$, and $R^9$ are each independently $C_{1-3}$ alkyl; $R^4$ and $R^5$ are each independently $C_{1-3}$ alkyl; and $R^6$ is $C_{1-3}$ alkyl.

In some embodiments, the quantum dot binding ligand has the structure of formula II:

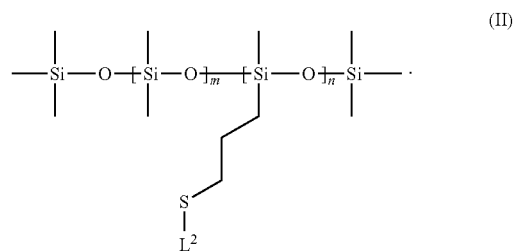

(II)

The present invention also provides a method of making a quantum dot binding ligand of formula I, which comprises:

reacting:

(a) a thiol functional siloxane polymer of formula IV:

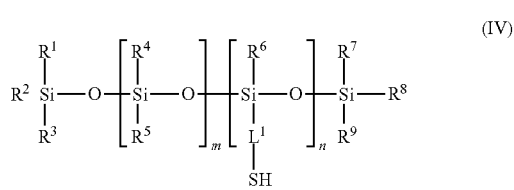

(IV)

wherein $R^1$, $R^2$, $R^3$, $R^7$, $R^8$, and $R^9$ are each independently $C_{1-20}$ alkyl, $C_{2-20}$ alkenyl, $C_{2-20}$ alkynyl, -$L^3$-$(R^{11})_q$, cycloalkyl, or aryl;

$R^4$ and $R^5$ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

$R^6$ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

each $R^{11}$ is independently $NR^{2a}R^{2b}$, C(O)OH, or $PR^{3a}R^{3b}$;
each $R^{12}$ is independently $C_{1-6}$ alkyl, cycloalkyl, or aryl;
$L^1$ is $C_{2-20}$ alkylene, $C_{2-20}$ heteroalkylene, or $C_{2-8}$ alkylene-O—$C_{2-8}$ alkylene;
$L^3$ is $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkyl-O—$C_{1-8}$ alkylene-(C(O)NH—$C_{2-8}$ alkylene)$_q$;
m is 0 to 1000;
n is 1 to 50; and
q is 1 to 10;
(b) with a first alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;
each $R^{10}$ is independently $NR^{2a}R^{2b}$, C(O)OH, or $PR^{3a}R^{3b}$;
each $R^{12}$ is independently $C_{1-6}$ alkyl, cycloalkyl, or aryl;
each of $R^{2a}$ and $R^{2b}$ is independently H or $C_{1-6}$ alkyl;
each of $R^{3a}$ and $R^{3b}$ is independently H or $C_{1-6}$ alkyl; and
q is 1 to 10;
in the presence of heat, light, or an initiator,
to obtain a compound of formula I.

In some embodiments, the method of making the quantum dot binding ligand of formula I further comprises reacting the mixture of (b) with:
(c) a second alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein each $L^4$ is substituted with $(R^{10})_q$, $Si(R^{12})_3$, or $C_{3-10}$ 2132.0870000;
each $R^{10}$ is independently $NR^{2a}R^{2b}$, C(O)OH, or $PR^{3a}R^{3b}$;
each $R^{12}$ is independently $C_{1-6}$ alkyl, cycloalkyl, or aryl;
each of $R^{2a}$ and $R^{2b}$ is independently H or $C_{1-6}$ alkyl;
each of $R^{3a}$ and $R^{3b}$ is independently H or $C_{1-6}$ alkyl; and
q is 1 to 10;
in the presence of heat, light, or an initiator,
to obtain a compound of formula I.

The present invention also provides a composition comprising a quantum dot binding ligand of formula I; and a first population of light emitting quantum dots.

In some embodiments, the quantum dot binding ligand of the composition has the structure of formula II:

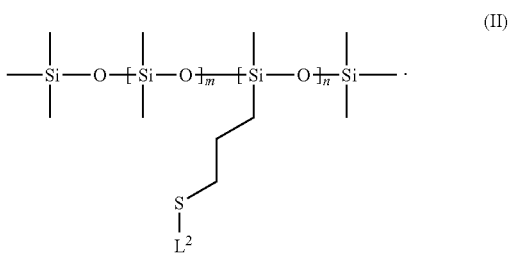

(II)

In some embodiments, the light emitting quantum dots of the composition are InP.

In some embodiments, the composition further comprises a matrix material.

DETAILED DESCRIPTION OF THE INVENTION

I. Definitions

As used herein, the singular terms "a" and "the" are synonymous and used interchangeably with "one or more" and "at least one," unless the language and/or context clearly indicates otherwise.

As used herein, the term "comprising" means including, made up of, and composed of All numbers in this description indicating amounts, ratios of materials, physical properties of materials, and/or use are to be understood as modified by the word "about," except as otherwise explicitly indicated.

The term "about" as used herein includes the recited number ±10%. Thus, "about ten" means 9 to 11.

"Siloxane polymer" or "polysiloxanes" refers to a polymer having a monomer repeat unit of the formula: —Si(R$_2$)O—. The R groups of the siloxane polymer can be the same or different, and can be any suitable group, including, but not limited to, hydrogen, alkyl, alkenyl, alkynyl, cycloalkyl, heterocycloalkyl, aryl, and heteroaryl. When both R groups are other than hydrogen, the siloxane polymer can be referred to as a "silicone." The siloxane polymers can be linear, branched, or cyclic. The siloxane polymer can include a single type of monomer repeat unit, forming a homopolymer. Alternatively, the siloxane polymer can include two or more types of monomer repeat units to form a copolymer that can be a random copolymer or a block copolymer.

"Solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. In some embodiments, the solubilizing group is a long-chain alkyl, a long-chain heteroalkyl, a long-chain alkenyl, a long-chain alkynyl, a cycloalkyl, or an aryl.

"Amine binding group" refers to an amine having the formula —NR$_2$ that serves to bind to a quantum dot. The R groups attached to the nitrogen atom can be any suitable group, including hydrogen and alkyl. Moreover, the R groups can be the same or different.

"Carboxy binding group" refers to the carboxylic acid group C(O)OH that serves to bind to a quantum dot.

"Phosphine binding group" refers to a phosphine having the formula —$PR_2$ that serves to bind to a quantum dot. The R groups attached to the phosphorus atom can be any suitable group, including hydrogen and alkyl. Moreover, the R groups can be the same or different.

"Alkyl" refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octane, nonane, decane, undecane, dodecane, tridecane, tetradecane, pentadecane, hexadecane, heptadecane, octadecane, nonadecane, or icosane. In some embodiments, the alkyl group is substituted. In some embodiments, the alkyl group is unsubstituted.

"Long-chain alkyl groups" are alkyl groups, as defined above, having at least 8 carbon chain atoms. In some embodiments, the long-chain alkyl group is $C_{8-20}$ alkyl, $C_{12-20}$ alkyl, $C_{14-20}$ alkyl, $C_{16-20}$ alkyl, or $C_{18-20}$ alkyl, In some embodiments, the long-chain alkyl group is octane, nonane, decane, undecane, dodecane, tridecane, tetradecane, pentadecane, hexadecane, heptadecane, octadecane, nonadecane, or icosane. In some embodiments, the long-chain alkyl group is substituted with a silane group.

"Alkylene" refers to a straight or branched, saturated, aliphatic radical having the number of carbon atoms indicated, and linking at least two other groups. The alkylene can link to 2, 3, 4, or more groups, and be divalent, trivalent, tetravalent, or multi-valent. The groups linked to the alkylene can be linked to the same atom or different atoms of the alkylene group. In some embodiments, the straight chain alkylene is the bivalent radical of —$(CH_2)_n$—, where n is 1, 2, 3, 4, 5, or 6. In some embodiments, the alkylene group is methylene, ethylene, propylene, isopropylene, butylene, isobutylene, sec-butylene, pentylene, or hexylene. In some embodiments, the alkylene group is substituted. In some embodiments, the alkylene group is unsubstituted.

"Alkylamine binding group" refers to an amine linked to an alkyl, as described above, and generally having the formula —$C_{1-20}$ alkyl-$NR_2$. The alkyl moiety of the alkylamine binding group is linked to the siloxane polymer of the present invention. Any suitable alkyl chain is useful. The R groups attached to the nitrogen atom can be any suitable group, including hydrogen and alkyl. Moreover, the R groups can be the same or different.

"Heteroalkyl" refers to an alkyl group of any suitable length and having from 1 to 5 heteroatoms such as N, O, and S. Additional heteroatoms include, but are not limited to, B, Al, Si, and P. The heteroatoms can also be oxidized, such as, —S(O)— and —$S(O)_2$—. In some embodiments, the heteroalkyl includes an ether (ethyleneoxy or poly(ethyleneoxy)), a thioether, or an alkyl-amine. In some embodiments, the heteroatom portion of the heteroalkyl replaces a hydrogen atom on the alkyl group to form a hydroxy, thio, or amino group. In some embodiments, the heteroatom portion is the connecting atom or is inserted between two carbon atoms.

"Long-chain heteroalkyl groups" are heteroalkyl groups, as defined above, having at least 8 chain atoms. In some embodiments, the long-chain heteroalkyl group is $C_{8-20}$ heteroalkyl, $C_{12-20}$ heteroalkyl, $C_{14-20}$ heteroalkyl, $C_{16-20}$ heteroalkyl, or $C_{18-20}$ heteroalkyl.

"Heteroalkylene" refers to a heteroalkyl group, as defined above, linking at least two other groups. The two moieties linked to the heteroalkylene can be linked to the same atom or different atoms of the heteroalkylene.

"Alkenyl" refers to a straight chain or branched hydrocarbon having at least 2 carbon atoms and at least one double bond. Alkenyl can include any number of carbons, such as $C_2$ alkenyl, $C_{2-3}$ alkenyl, $C_{2-4}$ alkenyl, $C_{2-5}$ alkenyl, $C_{2-6}$ alkenyl, $C_{2-7}$ alkenyl, $C_{2-8}$ alkenyl, $C_{2-9}$ alkenyl, $C_{2-10}$ alkenyl, $C_{2-12}$ alkenyl, $C_{2-14}$ alkenyl, $C_{2-16}$ alkenyl, $C_{2-18}$ alkenyl, $C_{2-20}$ alkenyl, $C_{8-20}$ alkenyl, $C_{12-20}$ alkenyl, $C_{14-20}$ alkenyl, $C_{16-20}$ alkenyl, and $C_{18-20}$ alkenyl. Alkenyl groups can have any suitable number of double bonds, including, but not limited to, 1, 2, 3, 4, 5, or more. In some embodiments, the alkenyl group is vinyl (ethenyl), propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. In some embodiments, the alkenyl group is substituted. In some embodiments, the alkenyl group is unsubstituted.

"Long-chain alkenyl groups" are alkenyl groups, as defined above, having at least 8 carbon chain atoms. In some embodiments, the long-chain alkenyl group is $C_{8-20}$ alkenyl, $C_{12-20}$ alkenyl, $C_{14-20}$ alkenyl, $C_{16-20}$ alkenyl, or $C_{18-20}$ alkenyl. In some embodiments, the long-chain alkenyl group is octene, nonene, decene, undecene, dodecene, tridecene, tetradecene, pentadecene, hexadecene, heptadecene, octadecene, nonadecene, or icosene. The long-chain alkenyl groups can have one or more alkene groups.

"Alkynyl" refers to either a straight chain or branched hydrocarbon having at least 2 carbon atoms and at least one triple bond. In some embodiments, the alkynyl is $C_2$ alkynyl, $C_{2-3}$ alkynyl, $C_{2-4}$ alkynyl, $C_{2-5}$ alkynyl, $C_{2-6}$ alkynyl, $C_{2-7}$ alkynyl, $C_{2-8}$ alkynyl, $C_{2-6}$ alkynyl, a $C_{2-10}$ alkynyl, $C_{2-12}$ alkynyl, $C_{2-14}$ alkynyl, $C_{2-16}$ alkynyl, $C_{2-18}$ alkynyl, $C_{2-20}$ alkynyl, $C_{8-20}$ alkynyl, $C_{12-20}$ alkynyl, $C_{14-20}$ alkynyl, $C_{16-20}$ alkynyl, or $C_{18-20}$ alkynyl. In some embodiments, the alkynyl group is acetylenyl, propynyl, 1-butyryl, 2-butyryl, isobutynyl, sec-butyryl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. In some embodiments, the alkynyl group is substituted. In some embodiments, the alkynyl group is unsubstituted.

"Long-chain alkynyl groups" are alkynyl groups, as defined above, having at least 8 carbon chain atoms. In some embodiments, the long-chain alkynyl group is $C_{8-20}$ alkynyl, $C_{12-20}$ alkynyl, $C_{14-20}$ alkynyl, $C_{16-20}$ alkynyl, or $C_{18-20}$ alkynyl. In some embodiments, the long-chain alkynyl group is octyne, nonyne, decyne, undecyne, dodecyne, tridecyne, tetradecyne, pentadecyne, hexadecyne, heptadecyne, octadecyne, nonadecyne, or icosyne. The long-chain alkynyl groups can have one or more alkyne groups.

"Cycloalkyl" refers to a saturated or partially unsaturated, monocyclic, fused bicyclic, or bridged polycyclic ring assembly containing from 3 to 12 ring atoms, or the number of atoms indicated. In some embodiments, the cycloalkyl is $C_{3-6}$ cycloalkyl, $C_{4-6}$ cycloalkyl, $C_{5-6}$ cycloalkyl, $C_{3-8}$ cycloalkyl, $C_{4-8}$ cycloalkyl, $C_{5-8}$ cycloalkyl, $C_{6-8}$ cycloalkyl, $C_{3-6}$ cycloalkyl, $C_{3-10}$ cycloalkyl, $C_{3-11}$ cycloalkyl, $C_{3-12}$ cycloalkyl, $C_{6-10}$ cycloalkyl, or $C_{6-12}$ cycloalkyl. In some embodiments the cycloalkyl is a saturated monocyclic cycloalkyl. In some embodiments, the saturated monocyclic cycloalkyl is cyclopropyl, cyclobutyl, cyclopentyl, cyclohexyl, or cyclooctyl. In some embodiments, the cycloalkyl is a saturated bicyclic or polycyclic cycloalkyl. In some embodiments, the saturated bicyclic or polycyclic cycloalkyl is norbornane, [2.2.2]bicyclooctane, decahydronaphthalene, or adamantane. In some embodiments, the cycloalkyl is partially unsaturated, having one or more double or triple bonds in the ring. In some embodiments, the partially unsaturated cycloalkyl is cyclobutene, cyclopentene, cyclohexene, 1,3-cyclohexadiene, 1,4-cyclohexadiene, cycloheptene, cycloheptadiene, cyclooctene, 1,3-cyclooctadiene, 1,4-cyclooctadiene, 1,5-cyclooctadiene, norbornene, or norbornadiene. In some embodiments the cycloalkyl is a saturated monocyclic $C_{3-8}$ cycloalkyl selected from cyclopropyl, cyclobutyl, cyclopentyl, cyclohexyl, cycloheptyl, and cyclooctyl. In some embodiments, the cycloalkyl is a saturated monocyclic $C_{3-6}$ cycloalkyl selected from cyclopropyl, cyclobutyl, cyclopentyl, and cyclohexyl. In some embodiments, the cycloalkyl is substituted. In some embodiments, the cycloalkyl is unsubstituted.

"Cycloalkoxy" refers to a cycloalkyl group, as defined herein, attached to the parent molecular group through an oxygen atom. In some embodiments, the cycloalkyl group can be further substituted with 1, 2, 3, or 4 substituent groups as described herein.

"Alkyl-cycloalkyl" refers to a radical having an alkyl component and a cycloalkyl component, where the alkyl component links the cycloalkyl component to the point of attachment. The alkyl component is as defined above, except that the alkyl component is at least divalent, and is linked to the cycloalkyl component and to the point of attachment. In some embodiments, the alkyl-cycloalkyl is $C_{1-2}$ alkyl-cycloalkyl, $C_{1-3}$ alkyl-cycloalkyl, $C_{1-4}$ alkyl-cycloalkyl, $C_{1-5}$ alkyl-cycloalkyl, $C_{1-6}$ alkyl-cycloalkyl, $C_{2-3}$ alkyl-cylcoalkyl, $C_{2-4}$ alkyl-cycloalkyl, $C_{2-5}$ alkyl-cycloalkyl, $C_{2-6}$ alkyl-cycloalkyl, $C_{3-4}$ alkyl-cycloalkyl, $C_{3-5}$ alkyl-cycloalkyl, $C_{3-6}$ alkyl-cycloalkyl, $C_{4-5}$ alkyl-cycloalkyl, $C_{4-6}$ alkyl-cycloalkyl, or $C_{5-6}$ alkyl-cycloalkyl. The cycloalkyl component is as defined within. In some embodiments, the alkyl-cycloalkyl is methyl-cyclopropyl, methyl-cyclobutyl, methyl-cyclopentyl, or a methyl-cyclohexyl.

"Aryl" refers to an aromatic ring system having any suitable number of ring atoms and any suitable number of rings. In some embodiments, the aryl group has 6, 7, 8, 9, 10, 11, 12, 13, 14, 15, or 16 ring atoms. In some embodiments, the aryl group has from 6 to 10, from 6 to 12, or from 6 to 14 ring atoms. Aryl groups can be monocyclic, fused to form bicyclic or tricyclic groups, or linked by a bond to form a biaryl group. In some embodiments, the aryl is phenyl, naphthyl, or biphenyl. In some embodiments, the aryl is a benzyl. In some embodiments, the aryl has from 6 to 12 ring atoms and is selected from phenyl, naphthyl, and biphenyl. Other aryl groups have from 6 to 10 ring members, such as phenyl or naphthyl. Some other aryl groups have 6 ring members, such as phenyl. In some embodiments, the aryl group is substituted. In some embodiments, the aryl group is unsubstituted.

"Alkyl-aryl" refers to a radical having an alkyl component and an aryl component, where the alkyl component links the aryl component to the point of attachment. The alkyl component is as defined above, except that the alkyl component is at least divalent, and links to the aryl component and to the point of attachment. In some embodiments, the alkyl-aryl is $C_{1-2}$ alkyl-aryl, $C_{1-3}$ alkyl-aryl, $C_{1-4}$ alkyl-aryl, $C_{1-5}$ alkyl-aryl, $C_{1-6}$ alkyl-aryl, $C_{2-3}$ alkyl-aryl, $C_{2-4}$ alkyl-aryl, $C_{2-5}$ alkyl-aryl, $C_{2-6}$ alkyl-aryl, $C_{3-4}$ alkyl-aryl, $C_{3-5}$ alkyl-aryl, $C_{3-6}$ alkyl-aryl, $C_{4-5}$ alkyl-aryl, $C_{4-6}$ alkyl-aryl, or $C_{5-6}$ alkyl-aryl. The aryl component is as defined above. In some embodiments, the alkyl-aryl is benzyl or ethyl-benzene. In some embodiments, the alkyl-aryl is substituted. In some embodiments, the alkyl-aryl is unsubstituted.

"Silane" or "silyl" refers to a silicon atom having several substituents, and generally having the formula —$SiR_3$. The R groups attached to the silicon atom can be any suitable group, including, but not limited to, hydrogen, halogen and alkyl. Moreover, the R groups can be the same or different.

"Forming a reaction mixture" refers to combining at least two components in a container under conditions suitable for the components to react with one another and form a third component.

"Cation" refers to metal and non-metal ions having at least a $1^+$ charge. Metals useful as the metal cation in the present invention include the alkali metals, alkali earth metals, transition metals, and post-transition metals. Alkali metals include Li, Na, K, Rb and Cs. Non-metal cations can be formed from a variety of groups including quaternary nitrogen groups such as ammonium ions, $R_4N^+$, wherein the R groups can be the same or different, and can be any suitable group, including, but not limited to, hydrogen, alkyl, alkenyl, alkynyl, cycloalkyl, heterocycloalkyl, aryl, and heteroaryl.

"Quantum dot" or "nanocrystal" refers to nanostructures that are substantially monocrystalline. A nanocrystal has at least one region or characteristic dimension with a dimension of less than about 500 nm, and down to the order of less than about 1 nm. The terms "nanocrystal," "quantum dot," "nanodot," and "dot," are readily understood by the ordinarily skilled artisan to represent like structures and are used herein interchangeably. The present invention also encompasses the use of polycrystalline or amorphous nanocrystals.

II. Quantum Dot Binding Ligands

The present invention provides a siloxane polymer ligand for binding to quantum dots (QDs) and related materials. The siloxane polymer ligands of the present invention contain a waxy component (long-chain alkyl) and a plurality of amine, carboxy, and/or phosphine groups capable of binding to QDs, thus improving the stability of the resulting ligand-QD complex.

In some embodiments, the present invention provides a quantum dot binding ligand having a siloxane polymer ligand including a plurality of monomer repeat units. The quantum dot binding ligand also includes a plurality of amine, carboxy, and/or phosphine binding groups each covalently attached to one of the monomer repeat units, thereby forming a first population of monomer repeat units. In some embodiments, the quantum dot binding ligand also includes a plurality of solubilizing groups each covalently attached to one of the monomer repeat units, thereby forming a second population of monomer repeat units.

The siloxane polymer can be any siloxane polymer having a waxy component and a binding component. The waxy component can be any solubilizing or hydrophobic group. In some embodiments, the solubilizing or hydrophobic group can be a long-chain alkyl group, a long-chain alkenyl group, a long-chain alkynyl group, a cycloalkyl, or an aryl.

In some embodiments, the solubilizing group or waxy component can be a long-chain alkyl. In some embodiments, each long-chain alkyl group can be octane, nonane, decane, undecane, dodecane, tridecane, tetradecane, pentadecane, hexadecane, heptadecane, octadecane, nonadecane, or icosane. In some embodiments, each long-chain alkyl group can be hexadecane, heptadecane, octadecane, nonadecane, or icosane. In some embodiments, each long-chain alkyl group can be hexadecane, octadecane, or icosane. In some embodiments, each long-chain alkyl group can be octadecane. The long-chain alkyl group can be linear or branched, and optionally substituted.

The siloxane polymer can have any suitable number of monomer repeat units. For example, the siloxane polymer can include from 5 to 100 monomer repeat units. Alternatively, the siloxane polymer can include about 5, 10, 15, 20, 25, 30, 40, 50, 60, 70, 80, 90 or 100 monomer repeat units. In some embodiments, the siloxane polymer can include from about 5 to about 50, or about 10 to about 50, or about 10 to about 25 monomer repeat units.

When there are at least two types of monomer repeat units, one type of monomer repeat can be present in a greater amount relative to the other types of monomer repeat units. Alternatively, the different types of monomer repeat units can be present in about the same amount. In some embodiments, the first population of monomer repeat units is about the same number as the second population of monomer repeat units.

Each monomer repeat unit can be the same or different. In some embodiments, there are at least two types of monomer repeat units in the siloxane polymer. In some embodiments, the siloxane polymer includes at least two types of monomer repeat units where the first type is a long-chain alkyl group and the second type is an alkylamine binding group. Other types of monomer repeat units can also be present. The siloxane polymer of the present invention can include 1, 2, 3, 4, or more different kinds of monomer repeat units. In some embodiments, the siloxane polymers of the present invention have a single type of monomer repeat unit. In other embodiments, the siloxane polymers of the present invention have two different types of monomer repeat units.

In some embodiments, the quantum dot binding ligand has the structure of formula I:

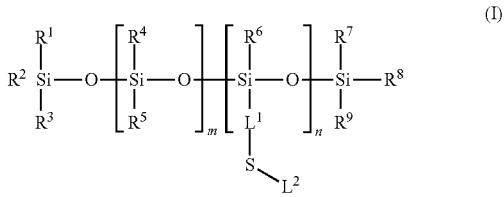

(I)

wherein $R^1$, $R^2$, $R^3$, $R^7$, $R^8$, and $R^9$ are each independently $C_{1-20}$ alkyl, $C_{2-20}$ alkenyl, $C_{2-20}$ alkynyl, -$L^3$-$(R^{11})_q$, cycloalkyl, or aryl;

$R^4$ and $R^5$ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

$R^6$ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

each $R^{11}$ is independently $NR^{2a}R^{2b}$, C(O)OH, or $PR^{3a}R^{3b}$;

each of $R^{2a}$ and $R^{2b}$ is independently H or $C_{1-6}$ alkyl;

each of $R^{3a}$ and $R^{3b}$ is independently H or $C_{1-6}$ alkyl;

each $L^1$ is independently $C_{2-20}$ alkylene, $C_{2-20}$ heteroalkylene, or $C_{2-8}$ alkylene-O—$C_{2-8}$ alkylene;

each $L^2$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^2$ is substituted with one or more $(R^{10})_q$, $Si(R^{12})_3$, or $C_{3-10}$ cycloalkoxy;

each $L^3$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$;

each $R^{10}$ is independently $NR^{2a}R^{2b}$, C(O)OH, or $PR^{3a}R^{3b}$;

each $R^{12}$ is independently $C_{1-6}$ alkyl, cycloalkyl, or aryl;

m is 0 to 1000;

n is 1 to 50; and q is 1 to 10.

In some embodiments, $R^1$, $R^2$, $R^3$, $R^7$, $R^8$, and $R^9$ are each independently $C_{1-20}$ alkyl, $C_{2-20}$ alkenyl, $C_{2-20}$ alkynyl, -$L^3$-$(R^{11})_q$, cycloalkyl, or aryl; $R^4$ is $C_{1-20}$ alkyl, $C_{2-20}$ alkenyl, $C_{2-20}$ alkynyl, cycloalkyl, or aryl; $R^5$ is $C_{8-20}$ alkyl, $C_{8-20}$ heteroalkyl, cycloalkyl, or aryl; $R^6$ is $C_{1-20}$ alkyl, $C_{1-20}$ heteroalkyl, $C_{2-20}$ alkenyl, $C_{2-20}$ alkynyl, cycloalkyl, or aryl; each $L^1$ and $L^2$ is independently $C_{3-8}$ alkylene; each $R^{10}$ is independently $NR^{2a}R^{2b}$ or C(O)OH; each of $R^{2a}$ and $R^{2b}$ is H or $C_{1-6}$ alkyl; each $L^3$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$; m is an integer from 5 to 100; n is an integer from 1 to 10; and q is an integer from 1 to 10.

Each $L^1$ can independently be any suitable linker to link the silyl group in the siloxane polymer to the thiol group. In some embodiments, each $L^1$ is $C_{3-8}$ alkylene or $C_{3-8}$ alkylene-O—$C_{2-8}$ alkylene. In some embodiments, $L^1$ is $C_{3-8}$ alkylene. In some other embodiments, each $L^1$ is independently propylene, butylene, pentylene, or n-propylene-O-isopropylene. In some embodiments, $L^1$ is propylene, butylene, or pentylene.

Each $L^2$ can independently be any suitable linker to link the binding group $R^{10}$ to the thiol group of the siloxane polymer. In some embodiments, each $L^2$ is independently $C_{3-8}$ alkylene, $C_{3-8}$ alkylene-O—$C_{2-8}$ alkylene, $C_{3-8}$ alkylene-(C(O)NH—$C_{2-8}$ alkylene)$_2$, or $C_{3-8}$ alkylene-O—$C_{1-8}$ alkylene-(C(O)NH—$C_{2-8}$ alkylene)$_3$. In some embodiments, $L^2$ is $C_{3-8}$ alkylene. In some other embodiments, $L^2$ is propylene, butylene, pentylene, n-propylene-O-isopropylene, or pentylene-(C(O)NH-ethylene)$_2$. In some embodiments, $L^2$ is propylene, butylene, or pentylene.

The binding group, $R^{10}$, is any suitable amine, carboxylic acid, and/or phosphine. In some embodiments, $R^{10}$ is a primary amine where both of $R^{2a}$ and $R^{2b}$ are H. In some embodiments, $R^{10}$ is a secondary amine where one of $R^{2a}$ and $R^{2b}$ is H and the other is $C_{1-6}$ alkyl. In some embodiments where $R^{10}$ is a secondary amine, $R^{2a}$ is methyl, ethyl, propyl, isopropyl, or butyl. Tertiary amines, where each of $R^{2a}$ and $R^{2b}$ is $C_{1-6}$ alkyl, are also useful as the binding group $R^{10}$. In embodiments where $R^{10}$ is a tertiary amine, the $R^{2a}$ and $R^{2b}$ can be the same or different. In some embodiments, the tertiary amine is a —N(Me)$_2$, —N(Et)$_2$, —N(Pr)$_2$—N(Me)(Et), —N(Me)(Pr), or —N(Et)(Pr).

In some embodiments, $L^2$ can be substituted with)($R^{10}$)$_q$. In some embodiments, each -$L^2$-$(R^{10})_q$ group can independently be $C_{3-8}$ alkylene-$(R^{10})_{1-3}$, $C_{3-8}$ heteroalkylene-$R^{10}$, or $C_{3-8}$ alkylene-$(C(O)NH—C_{2-8}$ alkylene-$R^{10})_2$. In some embodiments, each $L^2$-$(R^{10})_q$ group can independently be $C_{3-8}$ alkylene-$C(O)OH$, $C_{3-8}$ alkylene-$(C(O)OH)_2$, $C_{3-8}$ alkylene-$O—C_{2-8}$ alkylene-$(C(O)OH)_3$, $C_{3-8}$ alkylene-$NR^{2a}R^{2b}$, $C_{3-8}$ alkylene-$(C(O)NH—C_{2-8}$ alkylene-$NR^{2a}R^{2b})_2$, $C_{3-8}$ alkylene-$PR^{3a}R^{3b}$, $C_{3-8}$ alkylene-$O—C_{2-8}$ alkylene-$PR^{3a}R^{3b}$, or $C_{3-8}$ alkylene-$(C(O)NH—C_{2-8}$ alkylene-$PR^{3a}R^{3b})_2$. In some other embodiments, each $L^2$-$(R^{10})_q$ group can independently be $C_{3-8}$ alkylene-$C(O)OH$, $C_{3-8}$ alkylene-$(C(O)OH)_2$, or $C_{3-8}$ alkylene-$NR^{2a}R^{2b}$. In some other embodiments, each $L^2$-$(R^{10})_q$ group can independently be:

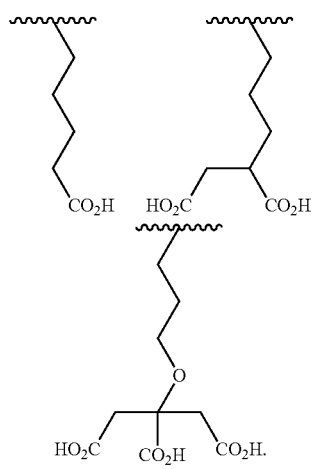

In some embodiments, each $L^2$-$(R^{10})_q$ group can independently be:

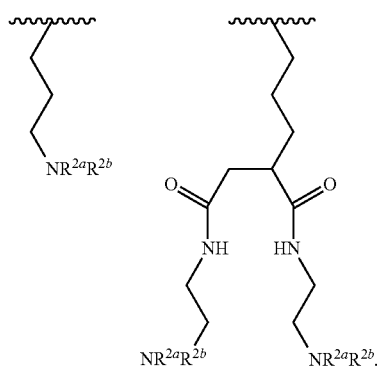

In some embodiments, at least one $L^2$ group is substituted by)$(R^{10})_q$ and at least one $L^2$ group is substituted by $Si(R^{12})_3$. In some embodiments, at least one $L^2$ group is substituted by $(R^{10})_q$, at least one $L^2$ group is substituted by $Si(R^{12})_3$, and at least one $L^2$ group is substituted by $C_{3-10}$ cycloalkoxy.

In some embodiments, one of radicals $R^5$ and $R^6$ is a solubilizing ligand. Any suitable solubilizing ligand can be used in the present invention. In some embodiments, at least one of $R^5$ and $R^6$ is $C_{8-20}$ alkyl or $C_{8-20}$ heteroalkyl, wherein each alkyl group is optionally substituted with one $—Si(R^{12})_3$ group. In some embodiments, at least one of $R^5$ and $R^6$ is $C_{8-20}$ alkyl or $C_{8-20}$ heteroalkyl. In some other embodiments, at least one of $R^5$ and $R^6$ is $C_{16}$ alkyl, $C_{18}$ alkyl, $C_{20}$ alkyl, or $—(CH_2)_2—(OCH_2CH_2)_3—OCH_3$, wherein each alkyl group is optionally substituted with one $—Si(R^{12})_3$ group. In some embodiments, at least one of $R^5$ and $R^6$ is $C_{16}$ alkyl, $C_{18}$ alkyl, $C_{20}$ alkyl, or $—(CH_2)_2—(OCH_2CH_2)_3—OCH_3$.

When the alkyl group of $R^5$ and $R^6$ is substituted with the $—Si(R^{12})_3$ group, the substitution can be at any point on the alkyl group, including the terminal carbon, or any other carbon in the alkyl chain. The alkyl group can be branched or unbranched. The $R^{12}$ group can be any suitable group that promotes solubilization of the siloxane polymer. In some embodiments, each $R^{12}$ is independently $C_{1-6}$ alkyl, cycloalkyl, or aryl. Each $R^{12}$ can be the same or different. In some embodiments, each $R^{12}$ is independently $C_{1-6}$ alkyl. The alkyl groups of $R^{12}$ can be branched or unbranched. Representative alkyl groups of $R^{12}$ include, but are not limited to, methyl, ethyl, propyl, etc. In some embodiments, each $R^{12}$ can be ethyl.

$R^4$ can be any suitable group. In some embodiments, $R^4$ is $C_{1-20}$ alkyl, $C_{2-20}$ alkenyl, $C_{2-20}$ alkynyl, cycloalkyl, or aryl. In other embodiments, $R^4$ is $C_{1-20}$ alkyl. In some other embodiments, $R^4$ is $C_{1-6}$ alkyl. In still other embodiments, $R^4$ is $C_{1-3}$ alkyl. In yet other embodiments, $R^4$ is methyl, ethyl, or propyl. In still yet other embodiments, $R^4$ is methyl.

Each $R^1$, $R^2$, $R^3$, $R^7$, $R^8$, and $R^9$ can be any suitable group. In some embodiments, each $R^1$, $R^2$, $R^3$, $R^7$, $R^8$, and $R^9$ can independently be $C_{1-20}$ alkyl, $C_{2-20}$ alkenyl, $C_{2-20}$ alkynyl, -$L^3$-$(R^{11})_q$, cycloalkyl, or aryl. In other embodiments, each $R^1$, $R^2$, $R^3$, $R^7$, $R^8$, and $R^9$ can independently be $C_{1-20}$ alkyl. In some other embodiments, each $R^1$, $R^2$, $R^3$, $R^7$, $R^8$, and $R^9$ can independently be $C_{1-6}$ alkyl. In still other embodiments, each $R^1$, $R^2$, $R^3$, $R^7$, $R^8$, and $R^9$ can independently be $C_{1-3}$ alkyl. In yet other embodiments, each $R^1$, $R^2$, $R^3$, $R^7$, $R^8$, and $R^9$ can independently be methyl, ethyl or propyl. In still yet other embodiments, each $R^1$, $R^2$, $R^3$, $R^7$, $R^8$, and $R^9$ can be methyl.

Alternatively, $R^1$, $R^2$, $R^3$, $R^7$, $R^8$, and $R^9$ can be an amine, carboxy, or phosphine binding group, or a solubilizing group. In some embodiments, at least one $R^1$, $R^2$, $R^3$, $R^7$, $R^8$, and $R^9$ can be -$L^3$-$(R^{11})_q$, as defined above. In other embodiments, at least one $R^1$, $R^2$, $R^3$, $R^7$, $R^8$, and $R^9$ can be $C_{8-20}$ alkyl. In some other embodiments, at least one $R^1$, $R^2$, $R^3$, $R^7$, $R^8$, and $R^9$ can be $C_{12-20}$ alkyl. In still other embodiments, at least one $R^1$, $R^2$, $R^3$, $R^7$, $R^8$, and $R^9$ can be octadecane.

Any suitable number of subscripts m and n can be present in the quantum dot binding ligands of the present invention. For example, the number of subscripts m and n can be from about 1 to about 1050, from about 5 to about 1000, from about 5 to about 50, or from about 10 to about 50, or from about 10 to about 25. Alternatively, the number of subscripts m and n can be about 5, 10, 15, 20, 25, 30, 40, 50, 60, 70, 80, 90, 100, 500, or about 1000.

Any suitable ratio of subscripts m and n can be present in the quantum dot binding ligands of the present invention. For example, the ratio of subscript m to n can be from about 100:1, 50:1, 25:1 20:1, 10:1, 5:1, 1:1, 1:2, 1:2.5, 1:5 or about 1:10. In some embodiments, the ratio of subscript m to subscript n is about 2:1. In some embodiments, the ratio of subscript m to subscript n is about 1:1. In some embodiments, the ratio of subscript m to subscript n is about 1:2.

In some embodiments, the quantum dot binding ligand has the structure of formula (II):

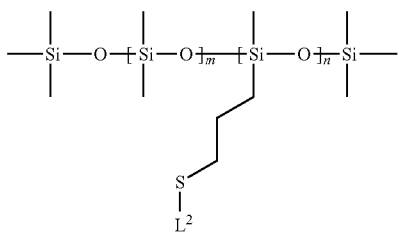

(II)

wherein
  m is 0 to 1000;
  n is 1 to 10;
  each $L^2$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^2$ is substituted with one or more $(R^{10})_q$, $Si(R^{12})_3$, or $C_{3-10}$ or cycloalkoxy;
  each $R^{10}$ is independently $NR^{2a}R^{2b}$, C(O)OH, or $PR^{3a}R^{3b}$;
  each of $R^{2a}$ and $R^{2b}$ is independently H or $C_{1-6}$ alkyl;
  each of $R^{1a}$ and $R^{1b}$ is independently H or $C_{1-6}$ alkyl;
  each $R^{12}$ is independently $C_{1-6}$ alkyl, cycloalkyl, or aryl; and
  q is 0 to 3.

In some embodiments, m is 36, 83, 108, 192, or 933. In some embodiments, n is 2, 5, 5.4, or 6. In some embodiments, m is 36 and n is 6. In some embodiments, m is 83 and n is 2. In some embodiments, m is 108 and n is 5.4. In some embodiments, m is 192 and n is 5. In some embodiments, m is 933 and n is 6.

In some embodiments, m is 36; n is 6; each $L^2$ is independently $C_{2-20}$ alkylene; each $R^{10}$ is independently C(O)OH; and q is 2.

In some embodiments, the quantum dot binding ligand includes 1, 2, 3, 4, or more different kinds of monomer n repeat units. In some embodiments, the quantum dot binding ligand has the structure of formula III:

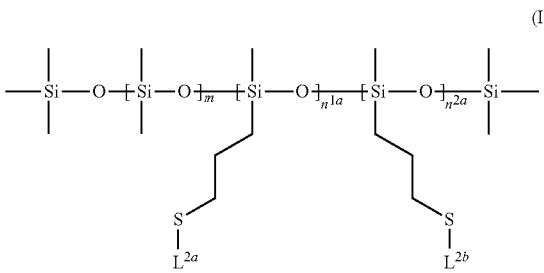

(III)

wherein
  m is 0 to 1000;
  $n^{1a}$ is 1 to 10;
  $n^{1b}$ is 1 to 10;
  each $L^{2a}$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^{2a}$ is substituted with one or more $(R^{10})_q$, $Si(R^{12})_3$, or $C_{3-10}$ cycloalkoxy;
  each $L^{2b}$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^{2b}$ is substituted with one or more $(R^{10})_q$, $Si(R^{12})_3$, or $C_{3-10}$ cycloalkoxy;
  each $R^{10}$ is independently $NR^{2a}R^{2b}$, C(O)OH, or $PR^{3a}R^{3b}$;
  each of $R^{2a}$ and $R^{2b}$ is independently H or $C_{1-6}$ alkyl;
  each of $R^{1a}$ and $R^{2b}$ is independently H or $C_{1-6}$ alkyl;
  each $R^{12}$ is independently $C_{1-6}$ alkyl, cycloalkyl, or aryl; and
  q is 0 to 3.

In some embodiments, $L^{2a}$ and $L^{2b}$ are $C_{2-20}$ alkylene In some embodiments, $L^{2a}$ is substituted with one or more $(R^{10})_q$ and $L^{2b}$ is substituted with $Si(R^{12})_3$.

In some embodiments, m is 36, $n^{1a}$ is 2, $H^{2b}$ is 4, $L^{2a}$ is $C_5$ alkylene, $L^{2b}$ is $C_3$ alkylene, $L^{2a}$ is substituted with two C(O)OH groups, and $L^{2b}$ is substituted with $Si(CH_3)_3$.

III. Method of Making Quantum Dot Binding Ligands

The quantum dot binding ligands of the present invention can be prepared by any suitable means known to one of skill in the art. In some embodiments, the quantum dot binding ligands of the present invention are prepared using the thiol-ene reaction. The lability of thiol hydrogens differentiates thiol-ene polymerizations from conventional free-radical polymerizations. The thiol-ene reaction takes advantage of the relatively weak sulfur-hydrogen bond (MeS—H=368.44 kJ/mol) which results in an easily abstractable hydrogen atom on the thiol group. The hydrogen atom is easily abstractable because the electron-poor hydrogen is bonded to the less electronegative sulfur atom as compared with the more electronegative alcohol oxygen from an alcohol group which is much more difficult to abstract (MeO—H=435.43 kJ/mol). The cleavage of the S—H bond can be promoted by direct photolysis (or simply by thermolysis) or indirectly using heat- or light-generated nucleophilic alkyl radicals obtained from the cleavage of initiators. The resulting electrophilic thiyl radicals (RS.) are extremely reactive and can add to a wide variety of unsaturated compounds to form new carbon-carbon linkages.

The thiol-ene reaction proceeds as a typical chain process with initiation, propagation, and termination steps. The reaction starts via initiation, which promotes hydrogen transfer from the thiol to one of the initiating free radicals generated, for example, via the cleavage of a photoinitiator. A thiyl radical results which can add across the C=C double bond (propagation step 1) yielding an intermediate β-thioether carbon-centered radical followed by chain transfer to a second thiol group (propagation step 2) to provide the final thiol-ene addition product with anti-Markovnikov orientation. The mechanism regenerates the RS. radical, thus there is no net consumption of thiol groups, allowing the polymerization to continue in a cyclic sequence. Termination reactions are frequently considered unimportant if compared with the rates of propagation and usually involve a bimolecular combination of the intervening radical species β-carbon or thiyl radicals), although these processes still remain obscure. The two-step mechanism for hydrothiolation of an isolated unsaturation is represented in Scheme 1.

Scheme 1.

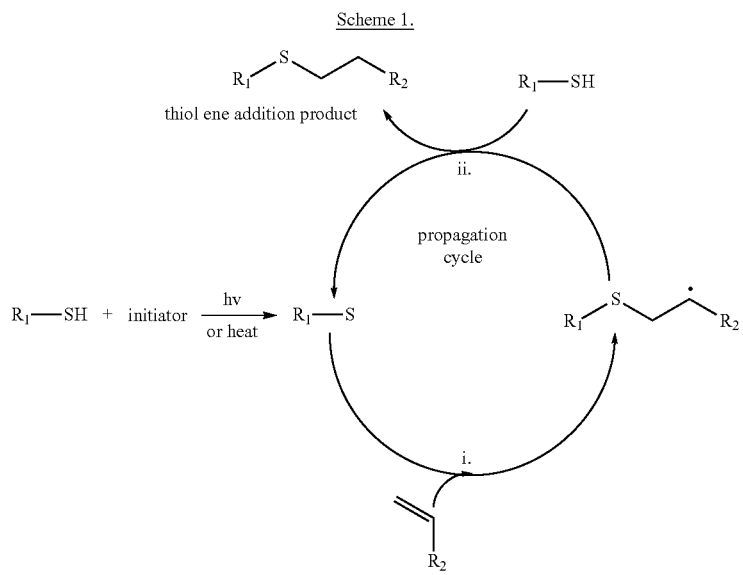

The step-wise growth mechanism of the free-radical thiol-ene coupling involving a terminal ene with alternating progation (i) and chain transfer (ii). In the absence of competing reactions, a single thiol group couples with an ene functionality to yield the final thioether (C-S) linkage.

In some embodiments, a commercially available thiol functional siloxane polymer can be reacted with an alkene containing at least one carboxy, amino, or phosphine functional group to provide the quantum dot binding ligand of formula I. In some embodiments, the commercially available thiol functional siloxane polymer is the mercapto functional silicone fluid GP-710, GP-71-SS, GP-656, GP-800, or GP-367 (Genesee Polymer Corporation, Burton, Mich.).

In some embodiments, the present invention provides a method of making a quantum dot binding ligand of formula I:

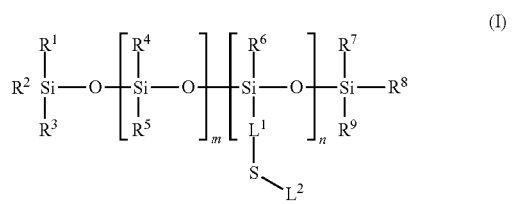

(I)

wherein
$R^1$, $R^2$, $R^3$, $R^7$, $R^8$, and $R^9$ are each independently $C_{1-20}$ alkyl, $C_{2-20}$ alkenyl, $C_{2-20}$ alkynyl, $-L^3-(R^{11})_q$, cycloalkyl, or aryl;
$R^4$ and $R^5$ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;
$R^6$ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;
each $R^{10}$ is independently $NR^{2a}R^{2b}$, $C(O)OH$, or $PR^{3a}R^{3b}$;
each of $R^{2a}$ and $R^{2b}$ is independently H or $C_{1-6}$ alkyl;
each of $R^{3a}$ and $R^{3b}$ is independently H or $C_{1-6}$ alkyl;
each $R^{11}$ is independently $NR^{2a}R^{2b}$, $C(O)OH$, or $PR^{3a}R^{3b}$;

each $R^{12}$ is independently $C_{1-6}$ alkyl, cycloalkyl, or aryl;
$L^1$ is $C_{2-20}$ alkylene, $C_{2-20}$ heteroalkylene, or $C_{2-8}$ alkylene-O—$C_{2-8}$ alkylene;
$L^2$ is $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^2$ is substituted with one or more $(R^{10})_q$, $Si(R^{12})_3$, or $C_{3-10}$ cycloalkoxy;
$L^3$ is $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$;
m is 0 to 1000;
n is 1 to 50; and
q is 1 to 10;
which comprises:
reacting:
(a) a thiol functional siloxane polymer of formula IV:

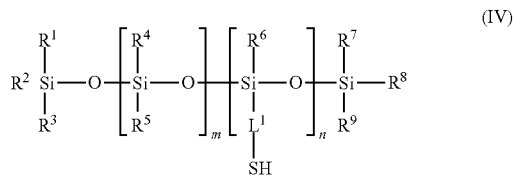

(IV)

wherein
$R^1$, $R^2$, $R^3$, $R^7$, $R^8$, and $R^9$ are each independently $C_{1-20}$ alkyl, $C_{2-20}$ alkenyl, $C_{2-20}$ alkynyl, $-L^3-(R^{11})_q$, cycloalkyl, or aryl;
$R^4$ and $R^5$ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;
$R^6$ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

each $R^{11}$ is independently $NR^{2a}R^{2b}$, C(O)OH, or $PR^{3a}R^{3b}$;

each $R^{12}$ is independently $C_{1-6}$ alkyl, cycloalkyl, or aryl;

$L^1$ is $C_{2-20}$ alkylene, $C_{2-20}$ heteroalkylene, or $C_{2-8}$ alkylene-O—$C_{2-8}$ alkylene;

$L^3$ is $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$;

m is 0 to 1000;
n is 1 to 50; and
q is 1 to 10;

(b) with a first alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;

each $R^{10}$ is independently $NR^{2a}R^{2b}$, C(O)OH, or $PR^{3a}R^{3b}$;

each $R^{12}$ is independently $C_{1-6}$ alkyl, cycloalkyl, or aryl;

each of $R^{2a}$ and $R^{2b}$ is independently H or $C_{1-6}$ alkyl;
each of $R^{3a}$ and $R^{3b}$ is independently H or $C_{1-6}$ alkyl; and
q is 1 to 10;

in the presence of heat, light, or an initiator,
to obtain a compound of formula I.

In some embodiments, the present invention provides a method of making a quantum dot binding ligand of formula (II):

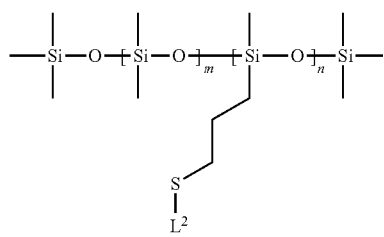
(II)

wherein
m is 0 to 1000;
n is 1 to 10;
$L^2$ is $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^2$ is substituted with one or more $(R^{10})_q$, $Si(R^{12})_3$, or $C_{3-10}$ cycloalkoxy;

each $R^{10}$ is independently $NR^{2a}R^{2b}$, C(O)OH, or $PR^{3a}R^{3b}$;

each of $R^{2a}$ and $R^{2b}$ is independently H or $C_{1-6}$ alkyl;

each of $R^{3a}$ and $R^{3b}$ is independently H or $C_{1-6}$ alkyl; and each $R^{12}$ is independently $C_{1-6}$ alkyl, cycloalkyl, or aryl; and q is 0 to 3.

which comprises:
reacting:
(a) a thiol functional siloxane polymer of formula VI:

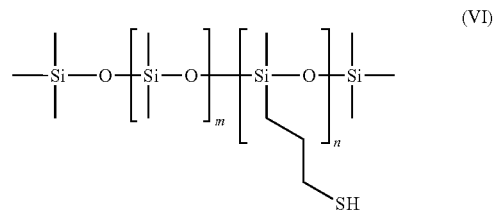
(VI)

wherein
m is 0 to 1000; and
n is 1 to 50;

(b) with a first alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;

each $R^{10}$ is independently $NR^{2a}R^{2b}$, C(O)OH, or $PR^{3a}R^{3b}$;

each of $R^{2a}$ and $R^{2b}$ is independently H or $C_{1-6}$ alkyl;
each of $R^{3a}$ and $R^{3b}$ is independently H or $C_{1-6}$ alkyl;
each $R^{12}$ is independently $C_{1-6}$ alkyl, cycloalkyl, or aryl; and
q is 1 to 10;

in the presence of heat, light, or an initiator,
to obtain a compound of formula II.

In some embodiments, the thiol functional siloxane polymer and the first alkene are added together in a ratio of thiol functional siloxane polymer:first alkene in a range from about 10:1 to about 2:1 molar equivalents, from about 5:1 to about 2:1 molar equivalents, from about 3:1 to about 2:1 molar equivalents, from about 10:1 to 1:1 molar equivalents, from about 5:1 to 1:1 molar equivalents, or from about 3:1 to 1:1 molar equivalents. In some embodiments, the ratio of thiol functional siloxane polymer:first alkene is about 10:1, 5:1, 3:1, 1:1, or 1:2.

The method of making the quantum dot binding ligand may employ at least one initiator. In some embodiments, the initiator is a water insoluble free radical initiator. In some embodiments, the free radical initiator is a solid free radical initiator. In some embodiments, the free radical initiator is selected from the group consisting of 2,2'-azobis(2-methylpropionitrile), azodiisobutyronitrile (Vazo® 64, DuPont, Wilmington, Del.), azodiisovaleronitrile (Vazo® 52, DuPont, Wilmington, Del.), 2,2'-(diazene-1,2-diyl)bis(2-methylbutanenitrile) (Vazo® 67, DuPont, Wilmington, Del.), 1,1'-(diazene-1,2-diyl)bis(cyclohexane-1-carbonitrile) (Vazo® 88, DuPont, Wilmington, Del.), 2,2'-azobis(4-methoxy-2,4-dimethyl valeronitrile (V-70, Wako Pure Chemicals, Richmond, Va.), 2,2'-azobis(2,4-dimethyl valeronitrile) (V-65, Wako Pure Chemicals, Richmond, Va.), dimethyl 2,2'-azobis(2-methylpropionate) (V-601, Wako Pure Chemicals, Richmond, Va.), 2,2'-azobis(2-methylbutyronitile) (V-59, Wako Pure Chemicals, Richmond, Va.), 2,2'-azobis[N-(2-propenyl)-2-methylpropionamide (VF-096, Wako Pure Chemicals, Richmond, Va.), 1-[(1-cyano-1-methylethyl)azo]formamide (V-30, Wako Pure Chemicals, Richmond, Va.), 2,2'-azobis(N-butyl-2-methylpropionamide (VAm-110, Wako Pure Chemicals, Richmond, Va.), 2,2'-azobis(N-cyclohexyl-2-methylpropionamide (VAm-111, Wako Pure Chemicals, Richmond, Va.), 2,2'-azobis(isobutyronitrile), 2,2'-azobis(N,N'-dimethyleneisobutyramidine) dihydrochloride, 2,2'-azobis(2-amidinopropane)dihydrochloride, 2,2'-azobis(N,N'-dimethyleneisobutyramidine), 1,1'-azobis(1-cyclohexanecarbo-nitrile), 4,4'-azobis(4-cyanopentanoic acid), 2,2'-azobis (isobutyramide)dihydrate, 2,2'-azobis(2-methylpropane), 2,2'-azobis(2-methylbutyronitrile), cyanopentanoic acid, the peroxy pivalates, dodecylbenzene peroxide, benzoyl peroxide, di-t-butyl hydroperoxide, t-butyl peracetate, acetyl peroxide, dicumyl peroxide, cumyl hydroperoxide, and dimethyl bis(butylperoxy) hexane. In some embodiments, the initiator is 1,1'-(diazene-1,2-diyl)bis(cyclohexane-1-carbonitrile).

In some embodiments, the initiator is employed in an amount sufficient to catalyze the reaction. In some embodiments, the thiol functional siloxane polymer and the initiator are added together in a ratio of thiol functional siloxane polymer:initiator in a range from about 1:100 to about 1:5 molar equivalents, from about 1:100 to about 1:10 molar equivalents, from about 1:100 to about 1:20 molar equivalents, from about 1:100 to about 1:50 molar equivalents, from about 1:50 to about 1:5 molar equivalents, from about 1:50 to about 1:10 molar equivalents, from about 1:50 to about 1:20 molar equivalents, from about 1:20 to about 1:5 molar equivalents, from about 1:20 to about 1:10 molar equivalents, or from about 1:10 to about 1:5 molar equivalents. In some embodiments, the ratio of thiol functional siloxane polymer:initiator is about 1:100, 1:50, 1:20, 1:10, or 1:5.

In some embodiments, the reaction comprises an organic solvent that does not chemically interfere with the reaction. In some embodiments, the organic solvent is methyl acetate, ethyl acetate, isopropyl acetate, n-butyl acetate, isobutyl acetate, acetone, methyl ethyl ketone, methyl isobutyl ketone, tetrahydrofuran, 2-methyltetrahydrofuran, acetonitrile, methyl t-butyl ether, dibutyl ether, cyclopentyl methyl ether, anisole, toluene, xylene, heptanes, and mixtures thereof. In some embodiments, the organic solvent is toluene.

In some embodiments, the reaction comprises reacting at a temperature of from about 40° C. to about 150° C., or from about 40° C. to about 120° C., or from about 40° C. to about 100° C., or from about 40° C. to about 80° C., or from about 40° C. to about 60° C., or from about 60° C. to about 150° C., or from about 60° C. to about 120° C., or from about 60° C. to about 100° C., or from about 60° C. to about 80° C., or from about 80° C. to about 150° C., or from about 80° C. to about 120° C., or from about 80° C. to about 100° C., or from about 100° C. to about 150° C., or from about 100° C. to about 120° C., or from about 120° C. to about 150° C.

In some embodiments, the reaction proceeds for about 0.5 hour to about 100 hours, for about 0.5 hour to about 60 hours, for about 0.5 hour to about 30 hours, for about 0.5 hour to about 20 hours, for about 0.5 hour to about 10 hours, for about 0.5 hour to about 5 hours, for about 0.5 hour to about 1 hour, for about 1 hour to about 100 hours, for about 1 hour to about 60 hours, for about 1 hour to about 30 hours, for about 1 hour to about 20 hours, for about 1 hour to about 10 hours, for about 1 hour to about 5 hours, for about 5 hours to about 100 hours, for about 5 hours to about 60 hours, for about 5 hours to about 30 hours, for about 5 hours to about 20 hours, for about 5 hours to about 10 hours, for about 10 hours to about 100 hours, for about 10 hours to about 60 hours, for about 10 hours to about 30 hours, for about 10 hours to about 20 hours, for about 20 hours to about 100 hours, for about 20 hours to about 60 hours, for about 20 hours to about 30 hours, for about 30 hours to about 100 hours, for about 30 hours to about 60 hours, or from about 60 hours to about 100 hours.

In some embodiments, the quantum dot binding ligand includes 1, 2, 3, 4, or more different kinds of monomer n repeat units. In some embodiments, the present invention provides a method of making a quantum dot binding ligand of formula III:

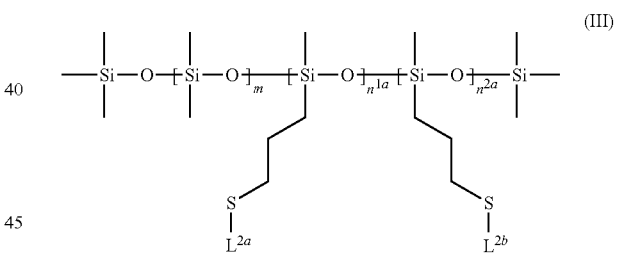

wherein
m is 0 to 1000;
$n^{1a}$ is 1 to 10;
$n^{1b}$ is 1 to 10;
each $L^{2a}$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^{2a}$ is substituted with one or more $(R^{10})_q$, $Si(R^{12})_3$, or $C_{3-10}$ cycloalkoxy;
each $L^{2b}$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^{2b}$ is substituted with one or more $(R^{10})_q$, $Si(R^{12})_3$, or $C_{3-10}$ cycloalkoxy;

each $R^{10}$ is independently $NR^{2a}R^{2b}$, C(O)OH, or $PR^{3a}R^{3b}$;
each of $R^{2a}$ and $R^{2b}$ is independently H or $C_{1-6}$ alkyl;
each of $R^{3a}$ and $R^{3b}$ is independently H or $C_{1-6}$ alkyl;
each $R^{12}$ is independently $C_{1-6}$ alkyl, cycloalkyl, or aryl; and
q is 0 to 3;
which comprises:
reacting:
(a) a thiol functional siloxane polymer of formula VI:

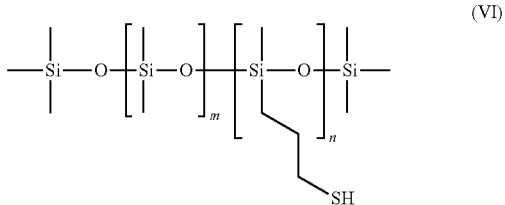

(VI)

wherein
m is 0 to 1000; and
n is 1 to 50;
(b) with a first alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;
each $R^{10}$ is independently $NR^{2a}R^{2b}$, C(O)OH, or $PR^{3a}R^{3b}$;
each of $R^{2a}$ and $R^{2b}$ is independently H or $C_{1-6}$ alkyl;
each of $R^{3a}$ and $R^{3b}$ is independently H or $C_{1-6}$ alkyl;
each $R^{12}$ is independently $C_{1-6}$ alkyl, cycloalkyl, or aryl; and
q is 1 to 10;
in the presence of heat, light, or an initiator, and
(c) a second alkene of formula (V):

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;
each $R^{10}$ is independently $NR^{2a}R^{2b}$, C(O)OH, or $PR^{3a}R^{3b}$;
each of $R^{2a}$ and $R^{2b}$ is independently H or $C_{1-6}$ alkyl;
each of $R^{3a}$ and $R^{3b}$ is independently H or $C_{1-6}$ alkyl;
each $R^{12}$ is independently $C_{1-6}$ alkyl, cycloalkyl, or aryl; and
q is 1 to 10;
in the presence of heat, light, or an initiator,
to obtain a compound of formula III.

In some embodiments, the first alkene and the second alkene are the same. In some embodiments, the first alkene and the second alkene are different.

In some embodiments, the thiol functional siloxane polymer and the second alkene are added together in a ratio of thiol functional siloxane polymer:second alkene in a range from about 10:1 to about 2:1 molar equivalents, from about 5:1 to about 2:1 molar equivalents, from about 3:1 to about 2:1 molar equivalents, from about 10:1 to 1:1 molar equivalents, from about 5:1 to 1:1 molar equivalents, or from about 3:1 to 1:1 molar equivalents. In some embodiments, the ratio of thiol functional siloxane polymer:second alkene is about 10:1, 5:1, 3:1, 1:1, or 1:2.

In some embodiments, the second alkene is added to the reaction mixture from about 1 minute to about 1 hour, from about 1 minute to about 30 minutes, from about 1 minute to about 20 minutes, from about 1 minutes to about 10 minutes, from about 1 minute to about 5 minutes, from about 5 minutes to about 1 hour, from about 5 minutes to about 30 minutes, from about 5 minutes to about 20 minutes, from about 5 minutes to about 10 minutes, from about 10 minutes to about 1 hour, from about 10 minutes to about 30 minutes, from about 10 minutes to about 20 minutes, from about 20 minutes to about 1 hour, from about 20 minutes to about 30 minutes, or from about 30 minutes to about 1 hour after the addition of the first alkene.

The methods of making the quantum dot binding ligands of the present invention offers several advantages over prior methods. The present method provides for easier product purification and also allows more control over the molecular weight of the product. By synthesizing the siloxane backbone and attaching additional functional groups using one or more thiol-ene reactions, the molecular weight of the product can easily be tuned to provide high and low molecular weight products.

IV. Compositions

The quantum dot binding ligands of the present invention can be complexed to a quantum dot (QD). In some embodiments, the present invention provides a composition of a quantum dot binding ligand of the present invention, and a first population of light emitting quantum dots (QDs).

In some embodiments, the quantum dot binding ligand can have the structure of formula I, as described above.

V. Quantum Dots

Quantum dots are also known as a semiconductor nanocrystals and are formed from crystals of semiconductor materials having a size in the nanometer range. In some embodiments, the quantum dots according to the present invention have cores having mean diameters of less than about 20 nm. In some embodiments, the core has a diameter or less than 20 nm. In some embodiments, the core has a diameter between about 2 nm and about 5 nm. Mean diameters of the quantum dots can be measured using techniques well known in the art such as transmission electron microscopy. The most striking property of quantum dots is that they emit fluorescence following exposure to exciting radiation, most usually ultraviolet light. This effect arises because quantum dots confine electrons, holes, or electron-hole pairs or so-called excitons to zero dimensions to a region on the order of the electrons' de Broglie wavelength. This confinement leads to discrete quantized energy levels and to the quantization of charge in units of the elementary electric charge. Quantum dots are particularly significant for optical applications due to their theoretically high quantum yield. Thus, compared to the conventional use of fluorescent labels that need to be continuously excited to produce fluorescence and therefore require complicated or expensive equipment for excitation and detection, the long lived radiation produced from quantum dots is advantageous for applications in which they are used as labels. Thus, the energy levels of small quantum dots can be probed by optical spectroscopy techniques.

Quantum dots have the further advantage that their energy levels, and hence the frequency of the radiation they emit, can be controlled by changing features such as the material from which the quantum dot is made, the size of the quantum dot, and the shape of the quantum dot. Generally, quantum dots emit light in visible wavelengths that can be seen by the unaided eye. While the material from which the quantum dot is formed has an effect on the wavelength of the light it emits, the size of the quantum dot usually has a more significant effect on the wavelength of light it emits and hence its visible coloration. In general, the larger quantum dots emit light towards the red end of the spectrum, while smaller quantum dots emit light towards the blue end of the spectrum. This effect arises as larger quantum dots have energy levels that are more closely spaced. This allows the quantum dot to absorb photons containing less energy, i.e. those closer to the red end of the spectrum.

Typically, the region of characteristic dimension will be along the smallest axis of the structure. The QDs can be substantially homogenous in material properties, or in certain embodiments, can be heterogeneous. The optical properties of QDs can be determined by their particle size, chemical or surface composition; and/or by suitable optical testing available in the art. The ability to tailor the nanocrystal size in the range between about 1 nm and about 15 nm enables photoemission coverage in the entire optical spectrum to offer great versatility in color rendering. Particle encapsulation offers robustness against chemical and UV deteriorating agents.

Additional exemplary nanostructures include, but are not limited to, nanowires, nanorods, nanotubes, branched nanostructures, nanotetrapods, tripods, bipods, nanoparticles, and similar structures having at least one region or characteristic dimension (optionally each of the three dimensions) with a dimension of less than about 500 nm, e.g., less than about 200 nm, less than about 100 nm, less than about 50 nm, or even less than about 20 nm or less than about 10 nm. Typically, the region or characteristic dimension will be along the smallest axis of the structure. Nanostructures can be, e.g., substantially crystalline, substantially monocrystalline, polycrystalline, amorphous, or a combination thereof.

QDs (or other nanostructures) for use in the present invention can be produced using any method known to those skilled in the art. For example, suitable QDs and methods for forming suitable QDs include those disclosed in: U.S. Pat. Nos. 6,225,198, 6,207,229, 6,322,901, 6,861,155, 6,872,249, 6,949,206, 7,572,393, 7,267,865, 7,374,807, and 8,563,133, each of which is incorporated by reference herein in its entirety.

The QDs (or other nanostructures) for use in the present invention can be produced from any suitable material, suitably an inorganic material, and more suitably an inorganic conductive or semiconductive material. In some embodiments, the QD is a compound from group II-VI, group III-V, group IV-VI, or group IV. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such semiconductors.

In some embodiments, the semiconductor nanocrystals or other nanostructures can also include a dopant, such as a p-type dopant or an n-type dopant. The nanocrystals (or other nanostructures) useful in the present invention can also include II-VI or III-V semiconductors. Examples of II-VI or III-V semiconductor nanocrystals and nanostructures include any combination of an element from Group II, such as Zn, Cd, and Hg, with any element from Group VI, such as S, Se, Te, and Po; and any combination of an element from Group III, such as B, Al, Ga, In, and Tl, with any element from Group V, such as N, P, As, Sb, and Bi. Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any method known to the ordinarily skilled artisan can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," *Science* 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," *J. Am. Chem. Soc.* 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," *J. Am. Chem. Soc.* 115:8706 (1993), the disclosures of which are incorporated by reference herein in their entireties. This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes. Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape. The ratio of surfactants to monomer, surfactants to each other, monomers to each other, and the individual concentrations of monomers strongly influence the kinetics of growth.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., *J. Am. Chem. Soc.* 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., *J. Am. Chem. Soc.* 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell luminescent nanocrystals include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such materials. Exemplary core-shell luminescent nanocrystals for use in the practice of the present invention include, but are not limited to, (represented as Core/Shell), CdSe/ZnS, InP/ZnS, PbSe/PbS, CdSe/CdS, CdTe/CdS, CdTe/ZnS, as well as others.

In some embodiments, CdSe is used as the nanocrystal material, due to the relative maturity of the synthesis of this material. Due to the use of a generic surface chemistry, it is also possible to substitute non-cadmium-containing nanocrystals. Exemplary luminescent nanocrystal materials include CdSe or ZnS, including core/shell luminescent nanocrystals comprising CdSe/CdS/ZnS, CdSe/ZnS, CdSeZn/CdS/ZnS, CdSeZn/ZnS, InP/ZnS, PbSe/PbS, CdSe/CdS, CdTe/CdS or CdTe/ZnS. In some embodiments, the quantum dots of the present invention can include core-shell QDs having a core including CdSe and at least one encapsulating shell layer including CdS or ZnS. In other embodiments, InP is used as the nanocrystal material.

In some embodiments, the light emitting quantum dots can be CdSe or CdTe and quantum-dot binding ligand can include an amine binding group. In other embodiments, the light emitting quantum dots can be CdSe or CdTe and $R_2$ can be $NR^{2a}R^{2b}$. In some other embodiments, the light emitting quantum dots can be InP and quantum-dot binding ligand can include a carboxy binding group. In still other embodiments, the light emitting quantum dots can be InP and $R_2$ can be C(O)OH.

The luminescent nanocrystals can be made from a material impervious to oxygen, thereby simplifying oxygen barrier requirements and photostabilization of the QDs in the QD phosphor material. In some embodiments, the luminescent nanocrystals can be coated with one or more quantum dot binding ligand of the present invention and dispersed in an organic polymeric matrix having one or more matrix materials, as discussed in more detail below. The luminescent nanocrystals can be further coated with one or more inorganic layers having one or more material such as a silicon oxide, an aluminum oxide, or a titanium oxide (e.g., $SiO_2$, $Si_2O_3$, $TiO_2$, or $Al_2O_3$), to hermetically seal the QDs.

VI. Matrix Materials

Generally, the polymeric ligand is bound to a surface of the nanostructure. Not all of the ligand material in the composition need be bound to the nanostructure, however. The polymeric ligand can be provided in excess, such that some molecules of the ligand are bound to a surface of the nanostructure and other molecules of the ligand are not bound to the surface of the nanostructure.

The phosphor material of the present invention further comprises a matrix material in which the QDs are embedded or otherwise disposed. The matrix material can be any suitable host matrix material capable of housing the QDs. Suitable matrix materials will be chemically and optically compatible with back-lighting unit (BLU) components, including the QDs and any surrounding packaging materials or layers. Suitable matrix materials include non-yellowing optical materials which are transparent to both the primary and secondary light, thereby allowing for both primary and secondary light to transmit through the matrix material. In some embodiments, the matrix material completely surrounds the QDs and provides a protective barrier which prevents deterioration of the QDs caused by environmental conditions such as oxygen, moisture, and temperature. The matrix material can be flexible in applications where a flexible or moldable QD film is desired. Alternatively, the matrix material can include a high-strength, non-flexible material.

In some embodiments, the matrix materials have low oxygen and moisture permeability, exhibit high photo- and chemical-stability, exhibit favorable refractive indices, and adhere to the barrier or other layers adjacent the QD phosphor material, thus providing an air-tight seal to protect the QDs. In some embodiments, the matrix materials are curable with UV or thermal curing methods to facilitate roll-to-roll processing. In some embodiments, the curing is thermal.

Suitable matrix materials for use in QD phosphor material of the present invention include polymers and organic and inorganic oxides. Suitable polymers for use in the matrixes of the present invention include any polymer known to the ordinarily skilled artisan that can be used for such a purpose. In suitable embodiments, the polymer will be substantially translucent or substantially transparent. Suitable matrix materials include, but are not limited to, epoxies, acrylates, norbornene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with bifunctional monomers, such as divinylbenzene; cross-linkers suitable for cross-linking ligand materials, epoxides which combine with ligand amines (e.g., APS or PEI ligand amines) to form epoxy, and the like.

The QDs used the present invention can be embedded in a polymeric matrix (or other matrix material) using any suitable method, for example, mixing the nanocrystals in a polymer and casting a film, mixing the nanocrystals with monomers and polymerizing them together, mixing the nanocrystals in a sol-gel to form an oxide, or any other method known to those skilled in the art. As used herein, the term "embedded" is used to indicate that the luminescent nanocrystals are enclosed or encased within the polymer that makes up the majority component of the matrix. It should be noted that luminescent nanocrystals are suitably uniformly distributed throughout the matrix, though in further embodiments they can be distributed according to an application-specific uniformity distribution function.

The composition optionally includes a plurality or population of the nanostructures, e.g., with bound ligand. The composition optionally includes a solvent, in which the nanostructure(s) and ligand can be dispersed. As noted, the nanostructures and ligand can be incorporated into a matrix to form a polymer layer or nanocomposite (e.g., a silicone matrix formed from the ligand). Thus, the composition can also include a crosslinker and/or an initiator. Suitable crosslinkers include organic or polymeric compounds with two or more functional groups (e.g., two, three, or four) that can react with amine groups (or other groups on the ligand) to form covalent bonds. Such functional groups include, but are not limited to, isocyanate, epoxide (also called epoxy), succinic anhydride or other anhydride or acid anhydride, and methyl ester groups, e.g., on a silicone, hydrocarbon, or other molecule. In one class of embodiments, the crosslinker is an epoxy crosslinker, e.g., an epoxycyclohexyl or epoxypropyl crosslinker. The reactive groups on the crosslinker can be pendant and/or terminal. The crosslinker is optionally an epoxy silicone crosslinker, which can be, e.g., linear or branched. In certain embodiments, the crosslinker is a linear epoxycyclohexyl silicone or a linear epoxypropyl (glycidyl) silicone. Suitable crosslinkers are commercially available.

The quantum dot compositions and films prepared using the quantum dot binding ligands of the present invention are useful in a variety of light emitting devices, quantum dot lighting devices, and quantum dot-based backlighting units. Representative devices are well known to those of skill in the art and can be found, for example, in U.S. Pat. Nos. 7,750,235, 8,053,972, and 8,343,575.

The quantum dot compositions of the present invention can be used to form a lighting device such as a backlighting unit (BLU). A typical BLU can include a QD film sandwiched between two barrier layers. QD films of the present invention can include a single quantum dot and a single quantum dot binding ligand, or a plurality of quantum dots and a plurality of quantum dot binding ligands. For example, a QD film of the present invention can include a cadmium quantum dot, such as CdS, CdTe, CdSe, CdSe/CdS, CdTe/CdS, CdTe/ZnS, CdSe/CdS/ZnS, CdSe/ZnS, CdSeZn/CdS/ZnS, or CdSeZn/ZnS, and a quantum-dot binding ligand having amine binding groups. The QD films of the present invention can include an InP quantum dot, such as InP or InP/ZnS, and a quantum-dot binding ligand having carboxy binding groups.

In some embodiments, the QD films of the present invention include both cadmium and indium containing quantum dots. When both cadmium and indium containing quantum dots are present, the QD film can include a first film containing the cadmium quantum dots and a second film containing the indium quantum dots. These films can then be stacked one on top of another to form a layered film. In some embodiments, a barrier film or other type of film can be stacked in between each of the cadmium and indium films. In other embodiments, the cadmium and indium quantum dots are mixed together in a single QD film with their respective quantum-dot binding ligands.

Mixed QD films, with either a single layer or multi-layer film, have the advantage of reducing the amount of cadmium in the system. For example, the cadmium can be reduced below 300 ppm, 200, 100, 75, 50 or 25 ppm. In some embodiments, the QD film contains less than about 100 ppm cadmium. In other embodiments, the QD film contains less than about 50 ppm cadmium. The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

EXAMPLES

General Methods

All manipulations were performed in an inert atmospheres glovebox. Reagents were used as received, except for allyl succinic acid, which was made from the hydrolysis of allylsuccinic anhydride with water and was dried under vacuum and $P_2O_5$ until no more weight loss was observed.

Example 1

Preparation of a Lower MW Succinic Acid Silicone Ligand

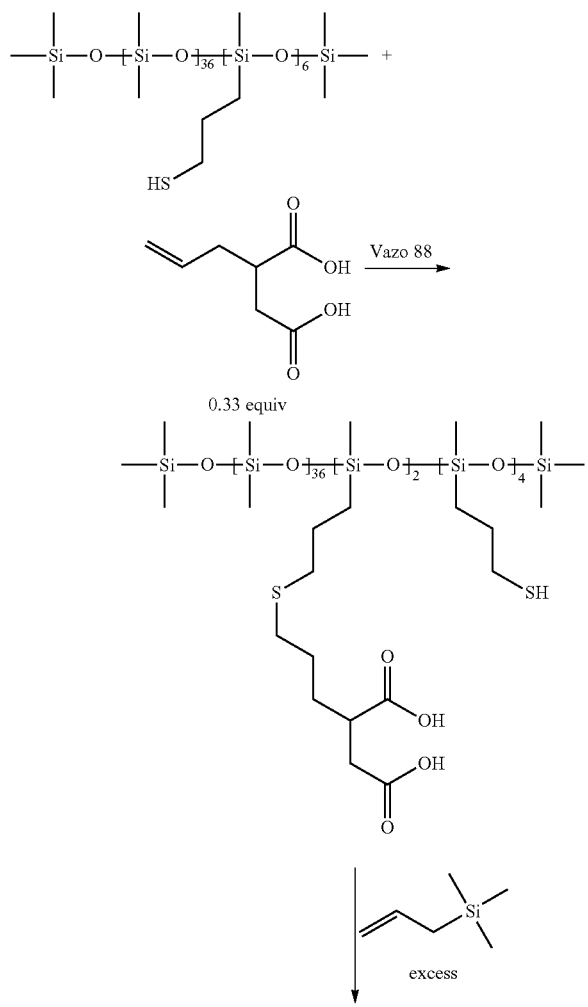

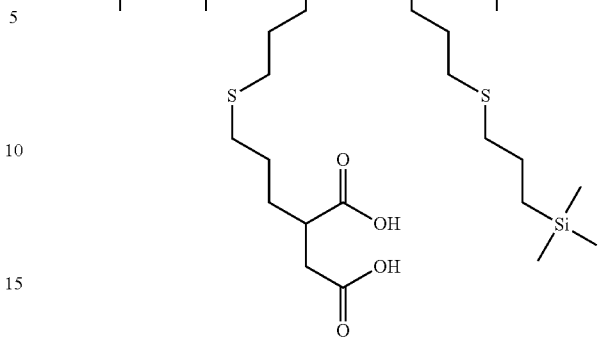

To a 20 mL vial of allyl succinic acid (0.439 g, 2.78 mmol) was added 2 mL toluene and the mixture was heated to dissolve at 84° C. In a separate vial was added 5.00 g (8.33 mmol of SH) of mercapto functional silicone fluid GP-367 (Genesse Polymers Corporation, Burton Mich.) with heating to 84° C. The hot silicone solution was added to the allyl succinic acid solution with rapid stirring and was immediately followed by the addition of 0.015 g of Vazo® 88 initiator (DuPont, Wilmington, Del.) pre-dissolved in 0.5 mL of toluene. The reaction continued to be heated at 84° C. After 5 minutes, 0.144 g (1.25 mmol) of allyltrimethylsilane was added. An NMR sample at 20 minutes showed 50% allyl succinic acid remaining. An additional 0.43 g (2.99 mmol) of allyltrimethylsilane was added. After 60 minutes, a NMR sample showed 10% allyl succinic acid remaining After 3 hours, an additional 0.43 g (2.99 mmol) of allyltrimethylsilane was added (an excess to remaining SH), and the reaction was run for 20 hours. After 20 hours, a NMR sample showed complete consumption of allyl succinic acid and 2% SH remaining (98% yield by NMR). The molecular weight (MW) of the resultant product was about 4370.

Example 2

Preparation of a Higher MW Succinic Acid Silicone Ligand

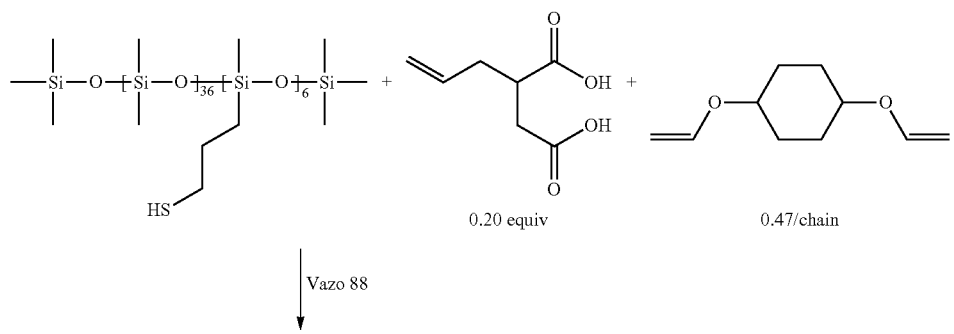

-continued

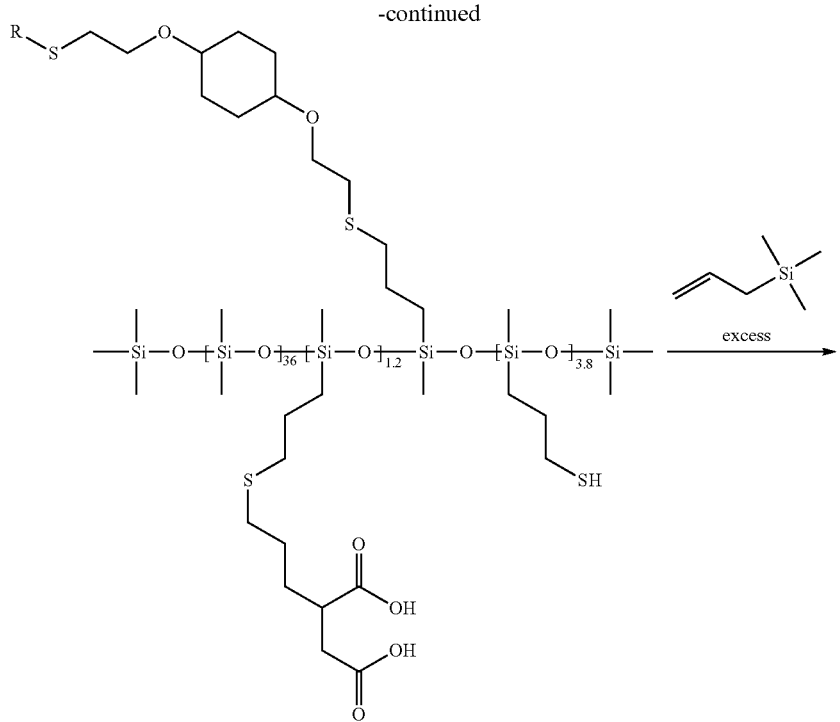

R = acid functionalized mercapto silicone chain

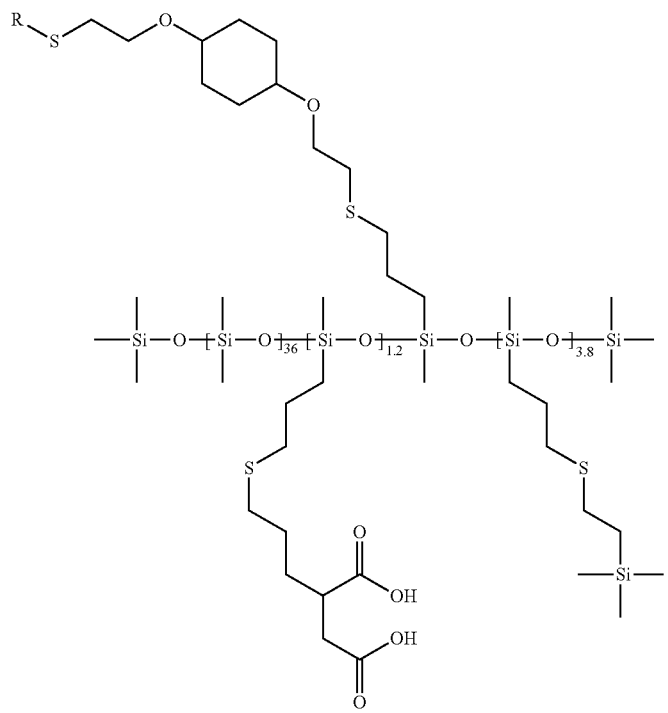

The preparation of the higher MW succinic acid silicone ligand follows the procedure of Example 1 using 0.20 equivalents of allyl succinic acid and 0.47 equivalents per chain of cyclohexane divinylether followed by the addition of an excess amount of allyltrimethylsilane. The MW of the resultant product was about 8200.

Example 3

Compositions of Quantum Dots with Lower MW Succinic Acid Silicone Ligand

Ligand exchange was accomplished by dissolving InP quantum dots in hexane or toluene, adding the lower MW succinic acid silicone ligand, heating at 50° C. to 60° C. for 16 hours to 36 hours, and removing the volatiles by vacuum transfer. The quantum yield and other parameters were maintained, and the nanocrystals were left in silicone as a clear oil. Exchanges with InP quantum dot solutions with lower MW succinic acid silicone ligands lots is provided in TABLE 1. As shown in TABLE 1, quantum yield (QY) is maintained and the wavelength (WL) and full width at half maximum (FWHW) are not significantly impacted with the various lots. And, as shown in TABLE 1, quantum yield is preserved, with some variability, in the exchange of DDSA (2-Dodecen-1-yl)-succinic acid to the silicone succinic acid polymer. Non-DDSA exchanged InP quantum yield increased 4.6% over the octadecene shell solution.

TABLE 1

Silicone Exchange Quantum Yield

| shell batch | silicone batch | pre exchange QY | post exchange QY | change QY | WL | FWHM | change WL | change FWHM |
|---|---|---|---|---|---|---|---|---|
| 1 | A | 80.5 | 82.2 | 1.7 | 607 | 42.4 | −0.7 | 0.2 |
| 2 | B | 82.6 | 82.9 | 0.3 | 526.3 | 46.9 | 0.2 | −0.4 |
| 3 | C | 88.1 | 86.7 | −1.4 | 531.9 | 53.7 | 3.8 | 0.2 |
| 4 | D | 80.16 | 82.7 | 2.54 | 614.9 | 48.7 | −0.1 | 0.1 |
| 5 | E | 72.1 (ODE) 69 (precipitated) | 76.7 | 4.6 | 525.8 | 42.1 | −0.2 | −0.8 |
| 6 | F | 82.9 | 80.6 | −2.3 | 527.5 | 43 | 0.2 | 0 |

Example 4

Preparation of Matrix

A white point film was prepared with the InP silicones of Example 3 mixed in an acrylate resin. Quantum dot enhancement film (QDEF) is an engineered sheet containing the InP silicone with a percentage of silicone of 13.2% green and 4.7% red. Data from the film is provided in TABLE 2. TABLE 2 shows the x and y color coordinates, the brightness (L), the wavelength (WL), and full width at half maximum (FWHM) of the prepared film.

TABLE 2

InP Silicone Film Data

| QDEF Data | | | | | | | | Burn-In QDEF Data | | |
|---|---|---|---|---|---|---|---|---|---|---|
| x | y | L | WL | FWHM | WL | FWHM | Thickness | x | y | L |
| 0.2815 | 0.2658 | 2044 | 540.75 | 37.35 | 619.50 | 49.28 | 90 | 0.2546 | 0.2401 | 2370 |

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. A quantum dot binding ligand comprising the structure of formula I:

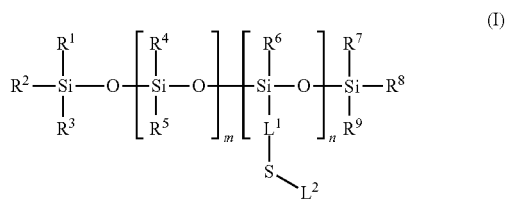

wherein $R^1$, $R^2$, $R^3$, $R^7$, $R^8$, and $R^9$ are each independently $C_{1-20}$ alkyl, $C_{2-20}$ alkenyl, $C_{2-20}$ alkynyl, $-L^3-(R^{11})_q$, cycloalkyl, or aryl;

$R^4$ and $R^5$ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

$R^6$ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;

each $R^{11}$ is independently $NR^{2a}R^{2b}$, $C(O)OH$, or $PR^{3a}R^{3b}$;

each of $R^{2a}$ and $R^{2b}$ is independently H or $C_{1-6}$ alkyl;

each of $R^{3a}$ and $R^{3b}$ is independently H or $C_{1-6}$ alkyl;

each $L^1$ is independently $C_{2-20}$ alkylene, $C_{2-20}$ heteroalkylene, or $C_{2-8}$ alkylene-O—$C_{2-8}$ alkylene;

each $L^2$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$, wherein each $L^2$ is substituted with one or more $(R^{10})_q$, $Si(R^{12})_3$, or $C_{3-10}$ cycloalkoxy;

each $L^3$ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$;

each R¹⁰ is independently NR²ᵃR²ᵇ, C(O)OH, or PR³ᵃR³ᵇ;

each R¹² is independently $C_{1-6}$ alkyl, cycloalkyl, or aryl;

m is 0 to 1000;

n is 2 to 50; and q is 1 to 10, wherein at least one L² group is substituted by Si(R¹²)₃, and wherein the ligand comprises 2, 3, or 4 different kinds of n repeat units.

2. The quantum dot binding ligand of claim 1, wherein R¹, R², R³, R⁷, R⁸, and R⁹ are each independently $C_{1-20}$ alkyl, $C_{2-20}$ alkenyl, $C_{2-20}$ alkynyl, -L³-(R¹¹)$_q$, cycloalkyl, or aryl;

R⁴ is $C_{1-20}$ alkyl, $C_{2-20}$ alkenyl, $C_{2-20}$ alkynyl, cycloalkyl, or aryl;

R⁵ is $C_{8-20}$ alkyl, $C_{8-20}$ heteroalkyl, cycloalkyl, or aryl;

R⁶ is $C_{1-20}$ alkyl, $C_{1-20}$ heteroalkyl, $C_{2-20}$ alkenyl, $C_{2-20}$ alkynyl, cycloalkyl, or aryl;

each L¹ and L² is independently $C_{3-8}$ alkylene;

each R¹⁰ is independently NR²ᵃR²ᵇ or C(O)OH;

each of R²ᵃ and R²ᵇ is H or $C_{1-6}$ alkyl;

each L³ is independently $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or $C_{3-8}$ alkylene-O—$C_{1-8}$ alkylene-(C(O)NH—$C_{2-8}$ alkylene)$_q$;

m is an integer from 5 to 100;

n is an integer from 2 to 10; and q is an integer from 1 to 10.

3. The quantum dot binding ligand of claim 1, wherein L¹ is independently selected from the group consisting of $C_{3-8}$ alkylene and $C_{3-8}$ alkylene-O—$C_{2-8}$ alkylene.

4. The quantum dot binding ligand of claim 1, wherein each L¹ is independently selected from the group consisting of propylene, butylene, pentylene, or n-propylene-O-isopropylene.

5. The quantum dot binding ligand of claim 1, wherein at least one L² group is substituted by (R¹⁰)$_q$.

6. The quantum dot binding ligand of claim 5, wherein the L²-(R¹⁰)$_q$ is independently selected from the group consisting of $C_{3-8}$ alkylene-C(O)OH, $C_{3-8}$ alkylene-(C(O)OH)₂, $C_{3-8}$ alkylene-O—$C_{2-8}$ alkylene-(C(O)OH)₃, $C_{3-8}$ alkylene-NR²ᵃR²ᵇ, $C_{3-8}$ alkylene-(C(O)NH—$C_{2-8}$ alkylene-NR²ᵃR²ᵇ)₂, $C_{3-8}$ alkylene-PR³ᵃR³ᵇ, $C_{3-8}$ alkylene-O—$C_{2-8}$ alkylene-PR³ᵃR³ᵇ, and $C_{3-8}$ alkylene-(C(O)NH—$C_{2-8}$ alkylene-PR³ᵃR³ᵇ)₂.

7. The quantum dot binding ligand of claim 5, wherein the L²-(R¹⁰)$_q$ is independently selected from the group consisting of $C_{3-8}$ alkylene-C(O)OH, $C_{3-8}$ alkylene-(C(O)OH)₂, and $C_{3-8}$ alkylene-NR²ᵃR²ᵇ.

8. The quantum dot binding ligand of claim 5, wherein the L²-(R¹⁰)$_q$ is independently selected from the group consisting of:

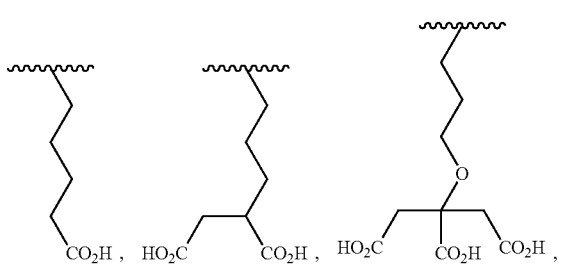

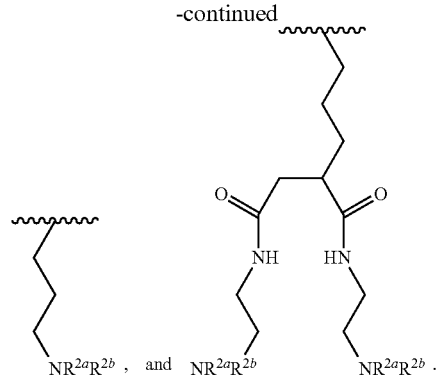

9. The quantum dot binding ligand of claim 1, wherein the Si(R¹²)₃ is Si(CH₃)₃.

10. The quantum dot binding ligand of claim 1, comprising 2 different kinds of n repeat units.

11. The quantum dot binding ligand of claim 1, wherein at least one L² group is substituted by (R¹⁰)$_q$ and at least one L² group is substituted by Si(R¹²)₃.

12. The quantum dot binding ligand of claim 1, wherein R¹, R², R³, R⁷, R⁸, and R⁹ are each independently $C_{1-3}$ alkyl;

R⁴ and R⁵ are each independently $C_{1-3}$ alkyl; and

R⁶ is $C_{1-3}$ alkyl.

13. The quantum dot binding ligand of claim 12, having the structure of formula II:

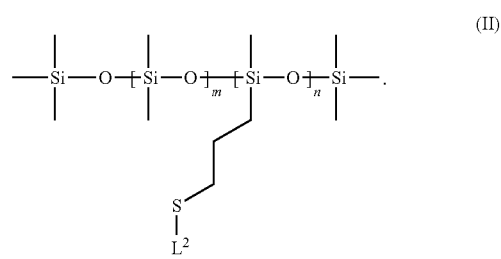

14. A method of making a quantum dot binding ligand of claim 1, which comprises:

reacting:

(a) a thiol functional siloxane polymer of formula IV:

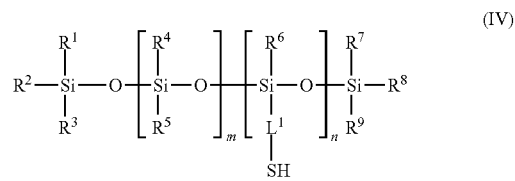

wherein

R¹, R², R³, R⁷, R⁸, and R⁹ are each independently $C_{1-20}$ alkyl, $C_{2-20}$ alkenyl, $C_{2-20}$ alkynyl, -L³-(R¹¹)$_q$, cycloalkyl, or aryl;

R⁴ and R⁵ are each independently $C_{1-20}$-alkyl, $C_{1-20}$ heteroalkyl, $C_{2-20}$-alkenyl, $C_{2-20}$-alkynyl, cycloalkyl, or aryl, each optionally substituted with one or more Si(R¹²)₃ groups;

R⁶ is $C_{1-20}$-alkyl, $C_{1-20}$ heteroalkyl, $C_{2-20}$-alkenyl, $C_{2-20}$-alkynyl, cycloalkyl, or aryl, each optionally substituted with one or more $Si(R^{12})_3$ groups;
each $R^{11}$ is independently $NR^{2a}R^{2b}$, $C(O)OH$, or $PR^{3a}R^{3b}$;
each $R^{12}$ is independently $C_{1-6}$ alkyl, cycloalkyl, or aryl;
$L^1$ is $C_{2-20}$ alkylene, $C_{2-20}$ heteroalkylene, or $C_{2-8}$ alkylene-O—$C_{2-8}$ alkylene;
$L^3$ is $C_{2-20}$ alkylene, $C_{2-20}$ heteroalkylene, $C_{2-8}$ alkylene-O—$C_{2-8}$ alkylene, $C_{2-8}$ alkylene-(C(O)NH—$C_{2-8}$ alkylene)$_q$, $C_{2-8}$ heteroalkylene-(C(O)NH—$C_{2-8}$ alkylene)$_q$, or
$C_{3-8}$ alkylene-O—$C_{1-8}$ alkylene-(C(O)NH—$C_{2-8}$ alkylene)$_q$;
m is 0 to 1000;
n is 2 to 50; and
q is 1 to 10;
(b) with a first alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;
each $R^{10}$ is independently $NR^{2a}R^{2b}$, $C(O)OH$, or $PR^{3a}R^{3b}$;
each $R^{12}$ is independently $C_{1-6}$ alkyl, cycloalkyl, or aryl;
each of $R^{2a}$ and $R^{2b}$ is independently H or $C_{1-6}$ alkyl;
each of $R^{3a}$ and $R^{3b}$ is independently H or $C_{1-6}$ alkyl; and
q is 1 to 10;
in the presence of heat, light, or an initiator,
to obtain a compound of formula I.
15. The method of claim 14, further comprising reacting the mixture of (b) with:
(c) a second alkene of formula V:

(V)

wherein
$L^4$ is $C_{2-18}$ alkylene, $C_{2-18}$ heteroalkylene, $C_{2-6}$ alkylene-O—$C_{2-8}$ alkylene, $C_{2-6}$ alkylene-(C(O)NH—$C_{2-8}$ alkylene)$_q$, $C_{2-6}$ heteroalkylene-(C(O)NH—$C_{2-8}$ alkylene)$_q$, or $C_{3-6}$ alkylene-O—$C_{1-8}$ alkylene-(C(O)NH—$C_{2-8}$ alkylene)$_q$, wherein $L^4$ is substituted with $(R^{10})_q$, $Si(R^{12})_3$, or $C_{3-10}$ cycloalkoxy;
each $R^{10}$ is independently $NR^{2a}R^{2b}$, $C(O)OH$, or $PR^{3a}R^{3b}$;
each $R^{12}$ is independently $C_{1-6}$ alkyl, cycloalkyl, or aryl;
each of $R^{2a}$ and $R^{2b}$ is independently H or $C_{1-6}$ alkyl;
each of $R^{3a}$ and $R^{3b}$ is independently H or $C_{1-6}$ alkyl; and
q is 1 to 10;
in the presence of heat, light, or an initiator,
to obtain a compound of formula I.
16. A composition comprising:
a quantum dot binding ligand of claim 1; and
at least one population of light emitting quantum dots.
17. The composition of claim 16, wherein the quantum dot binding ligand has the structure of formula II:

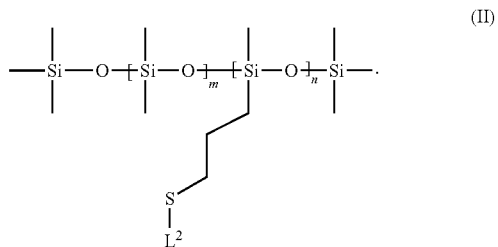
(II)

18. The composition of claim 16, wherein the light emitting quantum dots are InP.
19. The composition of claim 16, further comprising a matrix material.
20. The quantum dot binding ligand of claim 1, comprising 3 different kinds of n repeat units.

* * * * *